United States Patent
McDermott et al.

(10) Patent No.: US 6,187,471 B1
(45) Date of Patent: Feb. 13, 2001

(54) BIMODAL BATTERY

(75) Inventors: Patrick McDermott, Vienna, VA (US); Gerald Halpert, Pasadena, CA (US)

(73) Assignee: Zentek Corporation, Alexandria, VA (US)

(*) Notice: Under 35 U.S.C. 154(b), the term of this patent shall be extended for 0 days.

(21) Appl. No.: 09/263,228

(22) Filed: Mar. 5, 1999

Related U.S. Application Data

(60) Provisional application No. 60/092,794, filed on Jul. 14, 1998.

(51) Int. Cl.[7] ................................................. H01M 6/30
(52) U.S. Cl. .......................... 429/110; 429/115; 429/116
(58) Field of Search ................................. 429/110, 115, 429/116, 345, 346

(56) References Cited

U.S. PATENT DOCUMENTS

| | | |
|---|---|---|
| 2,787,650 | 4/1957 | Récopé et al. . |
| 2,936,327 | 5/1960 | Schrodt et al. . |
| 3,846,177 | 11/1974 | Mauch et al. . |
| 4,031,296 | 6/1977 | Sarbacher et al. . |
| 4,087,594 * | 5/1978 | Marincic et al. ................. 429/90 |
| 4,148,974 | 4/1979 | Eppley . |
| 4,499,160 | 2/1985 | Babai et al. . |
| 4,517,736 * | 5/1985 | Goebel ........................... 29/623.2 |
| 4,642,275 * | 2/1987 | Smith et al. ..................... 429/52 |
| 4,806,439 * | 2/1989 | Wessling et al. ................ 429/48 |
| 4,820,598 * | 4/1989 | Descroix et al. ................ 429/62 |
| 4,830,936 | 5/1989 | Planchat et al. . |
| 4,950,565 * | 8/1990 | Schisselbauer et al. .......... 429/116 |
| 5,196,276 | 3/1993 | Niksa et al. . |

OTHER PUBLICATIONS

D.L. Miller et al., "Long Life Reserve Li/SOCl$_2$ Battery", IEEE, 0–7803–2459–5/95, 1995, pp.49–51, (No Month).

N.A. Remer et al., "Development and Manufacture of a Large, Multi–Cell Lithiumthionly Chloride Reserve Battery," IEEE, 0–7803–0552–3/92, 1992, pp. 77–80, (No Month).

John C. Hall, "Performance and Safety to NAVSEA Instruction 9310.1A of Lithium–Thionyl Chloride Reserve Batteries", The 1983 Goddard Space Flight Center Battery Workshop, Nov. 15–17, 1983, pp. 149–158.

Dils et al., "Reserve Li/SOCl$_2$ Battery Safety Testing", The 1983 Goddard Space Flight Center Battery Workshop, Nov. 15–17, 1983, pp. 139–144.

* cited by examiner

*Primary Examiner*—Carol Chaney
(74) *Attorney, Agent, or Firm*—Venable; Robert J. Frank; Michael A. Sartori

(57) ABSTRACT

A battery has an outer casing, an electrolyte located within the outer casing, an additive located within the outer casing and separated from the electrolyte, and a power mode increasing device located within the outer casing. The battery operates in a low power mode. The power mode increasing device combines the electrolyte and the additive causing the battery to operate in a high power mode. The power generated by the battery operating in the high power mode is greater than the power generated by the battery operating in the low power mode.

25 Claims, 25 Drawing Sheets

BIMODAL BATTERY

CROSS-REFERENCE TO RELATED APPLICATIONS

This application claims the priority of U.S. Provisional Patent Application No. 60/092,794, filed Jul. 14, 1998, which is herein incorporated by reference.

BACKGROUND OF THE INVENTION

1. Field of the Invention

The invention relates to batteries, and particularly to batteries having two modes of operation.

2. Description of Prior Art

A battery is classified as either a primary battery or a secondary battery. A primary battery is one in which the stored energy is released in an irreversible process, and the battery is depleted when the total amount of stored energy is released. A secondary battery is one in which the stored energy is released in a reversible process, and the battery is capable of being repeatedly charged and discharged.

A reserve battery is a primary battery that can be stored for long periods of time prior to discharge and that requires some form of activation to bring it to a full operational state. The reserve battery is inhibited from open circuit self-discharge during the pre-activation state by having the electrolyte stored separately from the electrodes or by having the electrolyte infused into the plate stack of the battery in a non-conductive state.

Aerospace and defense applications usually employ a thermal battery as the reserve battery. For the thermal battery, the electrolyte permeates the plate stack as a solid state salt and is non-conductive for the range of storage temperatures in the pre-activation state. The thermal battery is activated by the ignition of an internal pyrotechnic that heats the electrolytic salt to a liquid state. In the liquid state, the electrolyte conducts current, and the thermal battery is activated.

In other reserve battery designs, the plate stack is dry, and the electrolyte is stored in liquid form in a separate storage reservoir. Upon activation, the electrolyte is injected into the plate stack allowing the battery to discharge current into a load attached to the terminals of the battery.

Lithium thionyl chloride ($Li/SOCl_2$) and other lithium-type batteries are widely used in commercial applications as primary batteries. As primary batteries, lithium batteries have substantial storage capacity and are capable of long-duration storage. However, lithium batteries have a limited rate of discharge because the non-corrosive electrolyte is not highly conductive. Under open circuit conditions, a passivation layer accumulates on the surface of the electrodes in the plate stack. The passivation layer protects against deterioration of the electrodes but prevents a high rate discharge for the lithium battery.

Lithium batteries are commercially used in watches, computers, and other electronic applications as low-drain, high capacity storage cells and are designed for long storage and operation life. However, because of their limited discharge rates, lithium batteries are not used with apparatuses that require short duration and high current drain, such as those apparatuses that normally employ thermal batteries.

Because of the high storage capacity of a lithium battery, a lithium battery can be used as a reserve battery if its discharge rate can be substantially increased. It is known that the discharge rate of a lithium battery can be substantially increased by increasing the acidity of the electrolyte through a substantial increase in the molar concentration of the acidic salts in the electrolyte. This acidic form of the electrolyte can support a much higher discharge rate for the battery, but is also highly corrosive to the electrodes, which limits battery life. Examples of using a lithium battery as a reserve battery include: D. L. Miller et al., "Long Life Reserve $Li/SOCl_2$ Battery," IEEE, 0-7803-2459-5/95, 1995, pp. 49–51; N. A. Remer et al., "Development and Manufacture of a Large, Multi-Cell Lithium Thionyl Chloride Reserve Battery," IEEE, 0-7803-0552-3/92, 1992, pp. 77–80; J. C. Hall, "Performance and Safety to NAVSEA Instruction 9310.1A of Lithium-Thionyl Chloride Reserve Batteries," The 1993 Goddard Space Flight Center Battery Workshop, Nov. 15–17, 1983, pp. 149–158; C. T. Dils et al., "Reserve $Li/SCl_2$ Battery Safety Testing," The 1993 Goddard Space Flight Center Battery Workshop, Nov. 15–17, 1983, pp. 139–144.

In the prior art, lithium batteries have been configured for use as primary reserve batteries by storing the highly acidic form of the electrolyte in a separate reservoir and then injecting the electrolyte into the dry electrode plate stack to activate the battery. For example, with a cylindrical reserve lithium battery, the electrolyte is stored in a separate reservoir adjacent to the plate stack and exterior to the battery. The separate reservoir is a cylindrical flexible container with bellowed walls. Prior to activation, the lithium reserve battery provides no power. Upon activation, a pyrotechnic gas generator is ignited, which drives a piston to collapse the container holding the electrolyte. The collapsing container forces the electrolyte into the plate stack.

In an example from the prior art, the bellowed walls are in a collapsed state in an electrolyte container prior to activation. The bellowed walls expand under gas pressure during activation to force the electrolyte into an adjacent plate stack. Prior to activation the battery provides no power. N. A. Remer et al., "Development and Manufacture of a Large, Multi-Cell Lithium Thionyl Chloride Reserve Battery," IEEE, 0-7803-0552-3/92, 1992, pp. 49–51.

In another example from the prior art, electrolyte is stored in a central cylindrical reservoir. The battery activation is initiated by an electrical pulse applied to an igniter which fires a gas generator. The expanding gas moves a piston which pressurizes the electrolyte. The increased pressure subsequently breaks a containment burst diaphragm and forces the electrolyte into a plate stack. The plate stack consists of series connected horseshoe shaped cells surrounding the central cylindrical reservoir of electrolyte. Prior to activation the battery provides no power. D. L. Miller et al., "Long Life Reserve $Li/SOCl_2$ Battery," IEEE, 0-7803-2459-5/95, 1995, pp. 75–80.

In another example from the prior art, a pressure plenum containing Freon® gas surrounds the outside of a bellows assembly and provides the pressure to collapse the bellows assembly. The collapsing bellows assembly transfers electrolyte to the plate stack. The battery activation is initiated by an electrical pulse applied to a cutter. The cutter bursts a nickel diaphragm, and the Freon® gas is allowed to collapse the bellows assembly. Prior to activation the battery provides no power. C. T. Dils et al., "Reserve $Li/SOCl_2$ Battery Safety Testing," The 1983 Goddard Space Flight Center Battery Workshop, Nov. 15–17, 1983, pp. 139–144.

In another example of the prior art, a battery is used in an undersea application. As the battery sinks, the pressure of the sea water is used to burst a disk above a piston forcing electrolyte into a dry plate stack using the hydrostatic pressure. Prior to activation the battery provides no power.

J. C. Hall, "Performance and Safety to NAVSEA Instruction 9310.1A of Lithium-Thionyl Chloride Reserve Batteries," The 1983 Goddard Space Flight Center Battery Workshop, Nov. 15–17, 1983, pp. 149–158.

These prior art lithium reserve batteries suffer from at least three drawbacks. First, the prior art batteries require much space because a separate reservoir is required to contain the separated electrolyte. Second, a large void space is created in the battery enclosure when the electrolyte is pumped into the dry plate stack by the pyrotechnic gas generator, the expanding Freon® gas, or the sea water used to displace the piston driving the electrolyte into the dry plate stack. Third, the prior art batteries have a single high power mode of operation and are incapable of sustaining power prior to activation because the plate stack is kept dry. The prior art batteries supply no power prior to being activated.

SUMMARY OF THE INVENTION

It is an object of the invention to provide a bimodal battery having a low power mode and a high power mode.

It is an object of the invention to provide a battery that can first supply low current and then supply high current.

It is an object of the invention to provide a battery having a dual mode of operation for use with apparatuses that require a low current electrical power for minimal electronic maintenance functions prior to activation of the battery, and then require a high current electrical power after activation of the battery.

It is an object of the invention to provide a battery for use with apparatuses that require no current prior to activation of the battery, wherein the battery is maintained in a reserve mode, and a high current electrical power after activation of the battery.

It is an object of the invention to provide a reserve battery that does not have a separate storage reservoir exterior and adjacent to the battery or a separate storage reservoir within the battery enclosure which constitutes a major percentage of the total battery volume.

It is an object of the invention to provide a reserve battery that does not create a large void within the battery enclosure upon activation.

It is an object of the invention to provide a reserve battery that has a wetted plate stack capable of supplying a low current or in the absence of any current drain, can be maintained for long periods of time in a storage or reserve mode.

The invention includes a battery operating in either a first or a second power mode. The battery includes: an outer casing; an electrolyte located inside the outer casing; an additive located within the outer casing and separated from the electrolyte; and a power mode increasing device located inside the outer casing for combining the electrolyte and the additive. The battery operates in a low power mode. The power mode increasing device combines the electrolyte and the additive causing the battery to operate in a high power mode.

The invention includes a power storage device comprising: means for encasing the device; means for storing an electrolyte within the means for encasing; means for storing an additive within the means for encasing and separate from the electrolyte; and means for combining the electrolyte and the additive located within the means for encasing. The device operates in a low power mode, and the means for combining combines the electrolyte and the additive to cause the device to operate in a high power mode.

The invention includes a method for constructing a battery comprising: providing an outer casing; storing an electrolyte within the casing; storing an additive within the casing separate from the electrolyte; and providing a power mode increasing device within the casing for combing the electrolyte and the additive. The battery operates in a low power mode prior to combination of the electrolyte and the additive and in a high power mode after the combination.

The above objects and advantages of the invention are illustrative, and not exhaustive, of those which can be achieved by the invention. Thus, these and other objects and advantages of the invention will be apparent from the description herein or can be learned from practicing the invention, both as embodied herein and as modified in view of any variations which may be apparent to those skilled in the art.

BRIEF DESCRIPTION OF THE DRAWINGS

Embodiments of the invention are explained in greater detail by way of the drawings, where the same reference numerals refer to the same features.

DESCRIPTION OF THE PREFERRED EMBODIMENTS

Figure 1:
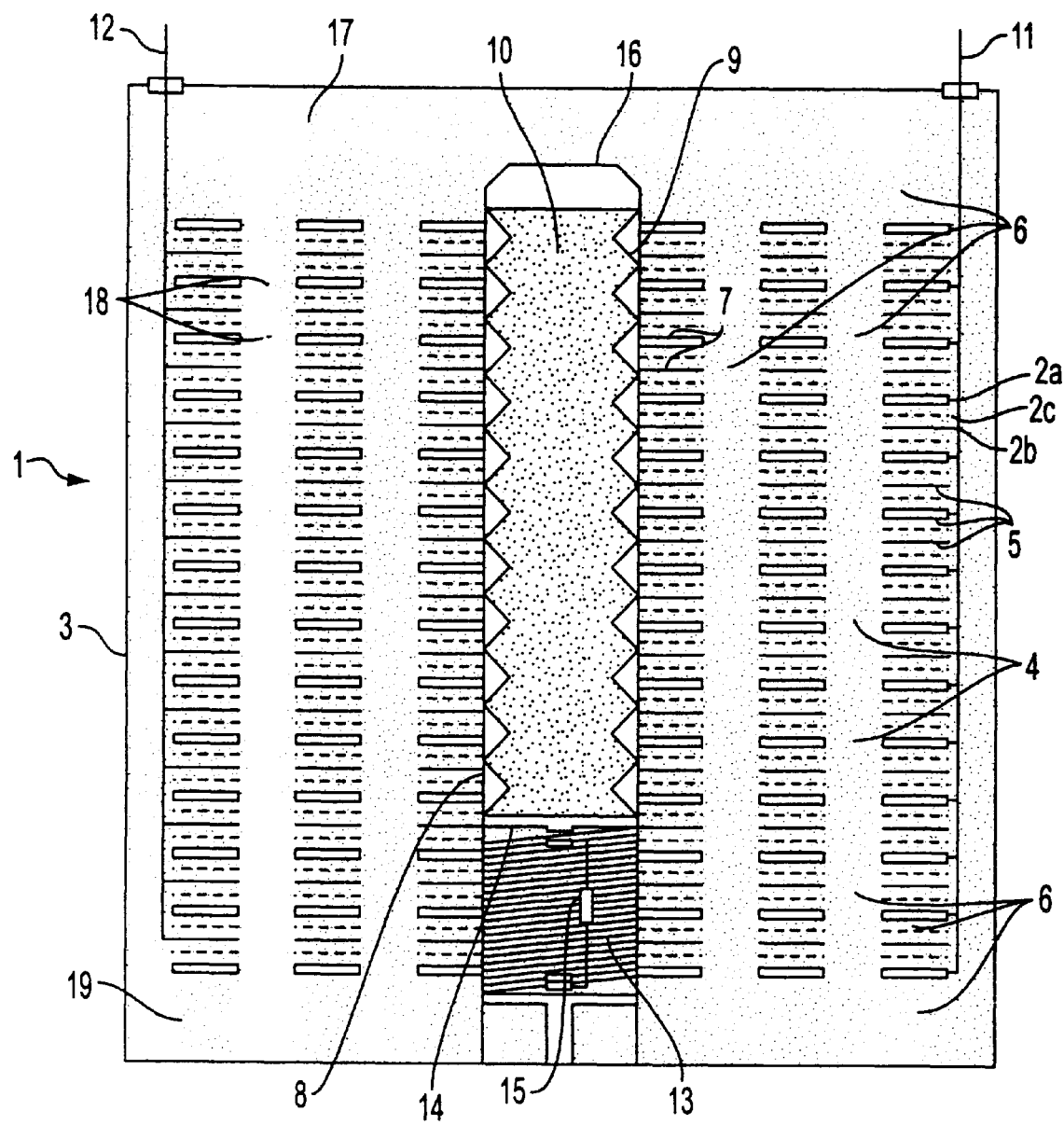
FIG. 1 illustrates a cross-sectional side view of a first embodiment of the invention in a pre-activation state.

FIG. 1 illustrates a cross-sectional side view of a first embodiment of the invention in a pre-activation state. The reference number 1 designates a bimodal reserve battery having a cylindrical shaped outer casing 3 and a plate stack with positive electrodes 2a and negative electrodes 2b. The positive electrodes 2a and negative electrodes 2b are represented as thick and thin lines, respectively. The positive and negative electrodes are separated by physically insulating membranes 2c, called permeable separators. The permeable separators 2c are permeable to the electrolyte 6 and are represented by dotted lines.

The positive electrodes 2a and the negative electrodes 2b are generally referred to herein as plates 5 in the plate stack. Each plate 5 has apertures 4 that form vertical channels 18 through the plate stack. The vertical channels 18 include not only the volumes of the apertures 4 but also the volumes between the plates above and below the apertures 4 having cross sections equal to the cross sections of the apertures 4.

Anode terminal 11 and cathode terminal 12 are used to electrically couple the positive electrodes 2a and the negative electrodes 2b, respectively, to a load. The positive electrodes are connected in parallel with each other and the negative electrodes are connected in parallel with each other so that the overall voltage of the battery is essentially the voltage of each individual cell.

The electrolyte 6 is located throughout the plate stack. Specifically, the electrolyte 6 is located above the plate stack in an upper manifold 17, between each plate 5, in each vertical channel 18, and below the plate stack in a lower manifold 19. The electrolyte 6 is a neutral or slightly acidic organic electrolyte solution. For, example, in the case of a thionyl chloride electrolyte, the electrolyte 6 can be a solution of $SOCl_2$ with very low concentrations of $LiCl/LiAlCl_4$. This non-corrosive, mildly acidic electrolyte is referred to herein as a "balanced" electrolyte.

Each plate 5 in the plate stack has a central aperture 7 (see also FIG. 4), and a central cylinder 8 extends through the central apertures 7. A container 9 is situated inside the central cylinder 8 and includes a pressure release valve 16, or a pressure sensitive frangible diaphragm, located on top of the container 9. Preferably, the container 9 is a sealed envelope with bellowed sides made of a thin polymeric material or a metal foil. The container 9 can be also implemented without bellowed sides.

An additive 10 is located inside the container 9. The additive 10 is a highly conductive form of the electrolyte 6. For example, in the case of thionyl chloride, the addictive 10 is a solution of $SOCl_2$ with extremely high concentrations of $LiCl/LiAlC_4$, which makes the additive extremely acidic. When the additive 10 is mixed with the balanced electrolyte 6, the mixture itself is highly conductive, still highly acidic, and capable of removing the passivation layers built up on the electrodes 2a, 2b. After mixing, this new form of electrolyte (balanced electrolyte 6 plus additive 10) permeates the entire plate stack and allows the battery to operate in a second mode as a high current drain device. Preferably, the additive 10, prior to mixing, is in the form of a liquid or liquid slurry. From a volumetric point of view, the amount and concentration of the additive 10, which is a minor component of the overall electrolyte, may vary depending on the rate of discharge required of the final electrolyte mixture.

In a variation, the additive 10 can be in the form of a dry powder. For example, in the case of the thionyl chloride system, the additive 10 can be an acid salt, such as $LiCl/LiAlC_4$. The frangible capsule 49 contains the powder form of the acid salt, which dissolves in the mixture after the frangible capsule 49 is broken.

The container 9 is compatible with or resistant to the corrosive elements within the additive 10 to maintain the integrity of the container 9 for a long storage period.

A piston 14 is coupled to the container 9, and a piston actuation means in the form of a spring 13 is coupled to the piston 14 to drive the piston 14 upward within the central cylinder 8. During a pre-activation state, the spring 13 is maintained in a compressed state by a spring releasing mechanism 15. The spring releasing mechanism 15 is preferably a mechanical or electro-mechanical device, such as a latch that holds the piston in place at the bottom of the central cylinder 8.

Figure 1A:
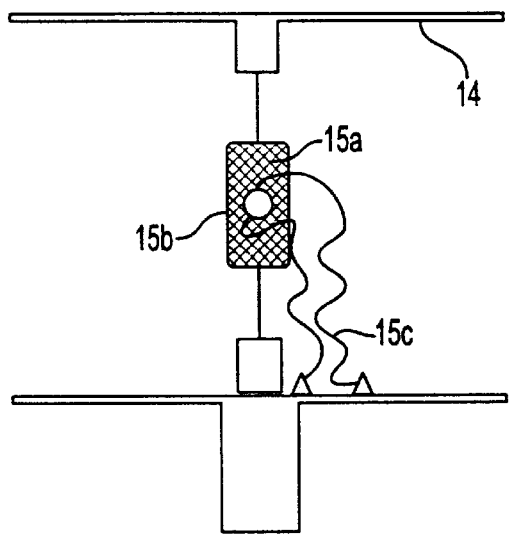
FIGS. 1(a)–1(d) illustrate examples of releasing mechanisms associated with release of a spring driven piston.

FIGS. 1(a)–1(d) illustrate various embodiments of the spring releasing mechanism 15 for releasing of the spring loaded piston 14 to mix the additive 10 with the electrolyte 6. In FIG. 1(a), the base of the piston 14 is held down by a frangible ceramic or glass tube 15a containing a small pyrotechnic charge 15b. The pyrotechnic charge 15b is ignited by an electrical pulse through circuit wires 15c. When the charge ignites, the tube 15a is fractured and allows the piston to ascend through the force of the compressed spring 13. This embodiment is analogous to an exploding bolt in aerospace applications.

Figure 1B:
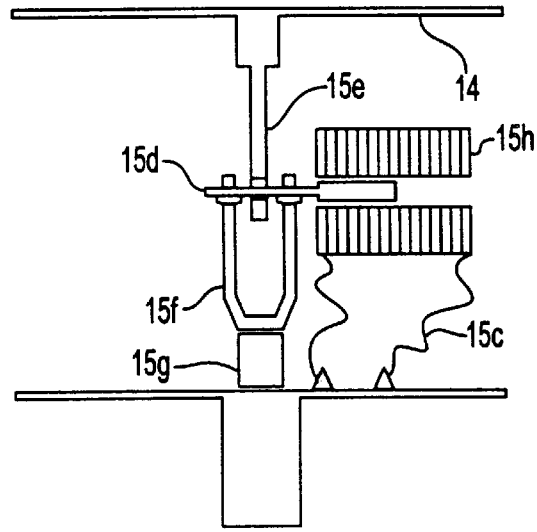

In FIG. 1(b), a clevis and pin arrangement is shown. A pin 15d passes through a hole in a member 15e attached to the base of the piston 14 and through holes in a U-shaped member 15f attached to a base 15g. The removal of the pin 15d allows the piston 14 to ascend under the force of the compressed spring 13. The pin 15d is removed electro-mechanically by operation of a solenoid 15h, which is activated via circuit wires 15c.

Figure 1C:
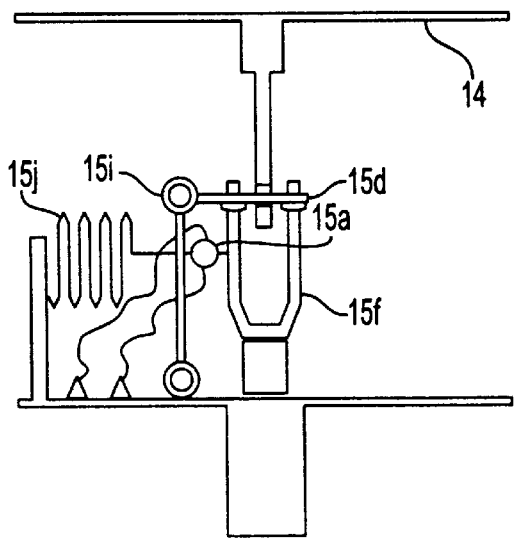
Figure 1D:
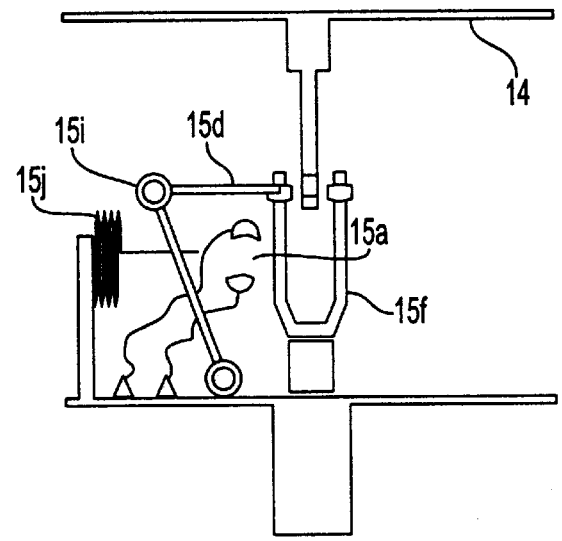

In FIG. 1(c), the pin 15d is held in place by a rotating arm 15i attached to a compressed spring 15j. The spring 15j is held in place by a frangible link 15a similar to that shown in FIG. 1(a). Upon ignition as shown in FIG. 1(d), the frangible link 15a releases the rotating arm 15i. The rotating arm 15i rotates from the force of the attached spring 15j and removes the pin 15d from the U-shaped member 15f causing the piston 14 to ascend under the force of the compressed spring 13.

During the pre-activation state in FIG. 1, the electrolyte 6 and the additive 10 are maintained separate from one another. The battery 1 is in a low power mode and can supply a low current to an apparatus coupled to the terminals 11 and 12. Because the electrodes 2a and 2b are wetted with the electrolyte 6, the battery is able to supply the low current. During the pre-activation state, passivation layers accumulate on the lithium electrodes.

Figure 2:
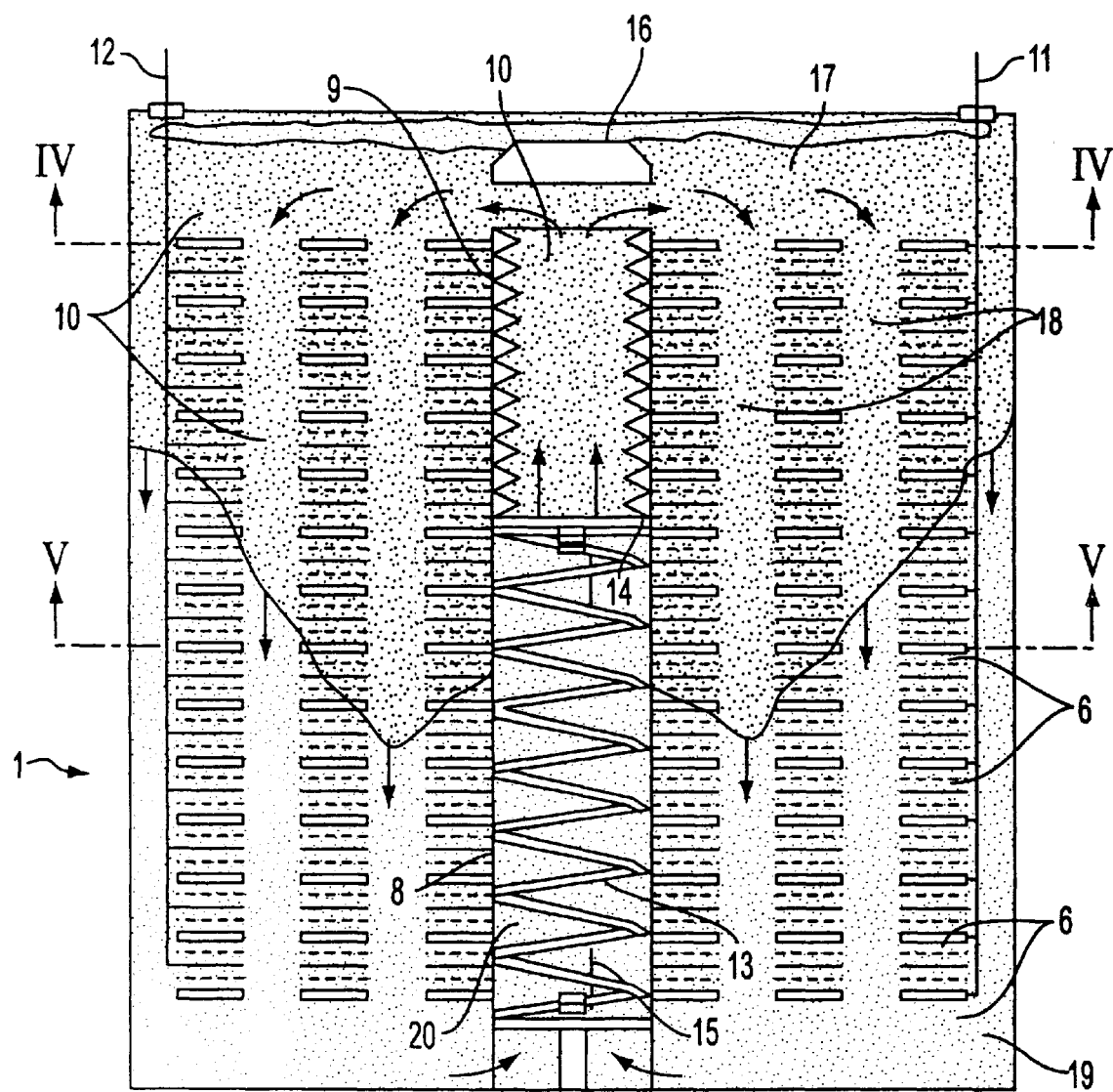
FIG. 2 illustrates a cross-sectional side view of the first embodiment of the invention in a mid-activation state.

FIG. 2 illustrates a cross-sectional side view of the first embodiment of the invention in a mid-activation state, which occurs after the pre-activation state illustrated in FIG. 1. When it is desired that the battery 1 be switched from the low power mode to a high power mode, the spring releasing mechanism 15 is activated. Upon activation of the spring releasing mechanism 15, the spring 13 is released and expands upward. The expanding spring 13 forces the piston 14 upward through the central cylinder 8, as indicated in FIG. 2 by the upward direction arrows above the piston 14. The moving piston 14 compresses the container 9 and thereby increases the pressure in the container 9. The container 9 is compressed in an accordion-type manner due to its bellowed configuration. It is not, however, essential that the container 9 have bellowed walls, and any polymeric or metal foil enclosure with a flexible skin can serve the same purpose. The increasing pressure in the container 9 forces the pressure release valve 16 to open. In an alternative embodiment, the pressure release valve 16 can be replaced by a frangible diagram, and the increasing pressure in the container 9 fractures the frangible diaphragm.

The opened pressure release valve 16, or the fractured frangible diaphragm, releases pressure in the container 9 by permitting the additive 10 to flow out of the container 9 and into the upper manifold 17. This flow is indicated in FIG. 2 by the arrows exiting the pressure release valve 16. The flowing additive 10 displaces the electrolyte 6 in the manifold 17, and the electrolyte 6 flows into the vertical channels 18. The continued flow of the additive 10 from the container 9 forces the additive to follow the electrolyte 6 into the vertical channels 18, as indicated in FIG. 2 by the downward direction arrows in the manifold 17 and in the vertical channels 18.

The moving piston 14 draws the electrolyte 6 from the lower manifold 19 into a region 20 of the central cylinder 8 located below the piston 14. The volume of the region 20 continually enlarges as the piston 14 moves upward, and electrolyte 6 continually flows into the region 20 as the piston 14 moves upward.

During the mid-activation state, the electrolyte 6 and the additive 10 begin to combine. Specifically, the electrolyte 6 and the additive 10 first combine in the upper manifold 17, and then combine in the vertical channels 18. Upon activating the spring releasing mechanism 15, the battery 1 begins switching from the low power mode to the high power mode. The battery should attain full high capability in the high power mode within a couple of seconds after activation, which is quite adequate for most applications.

Figure 3:
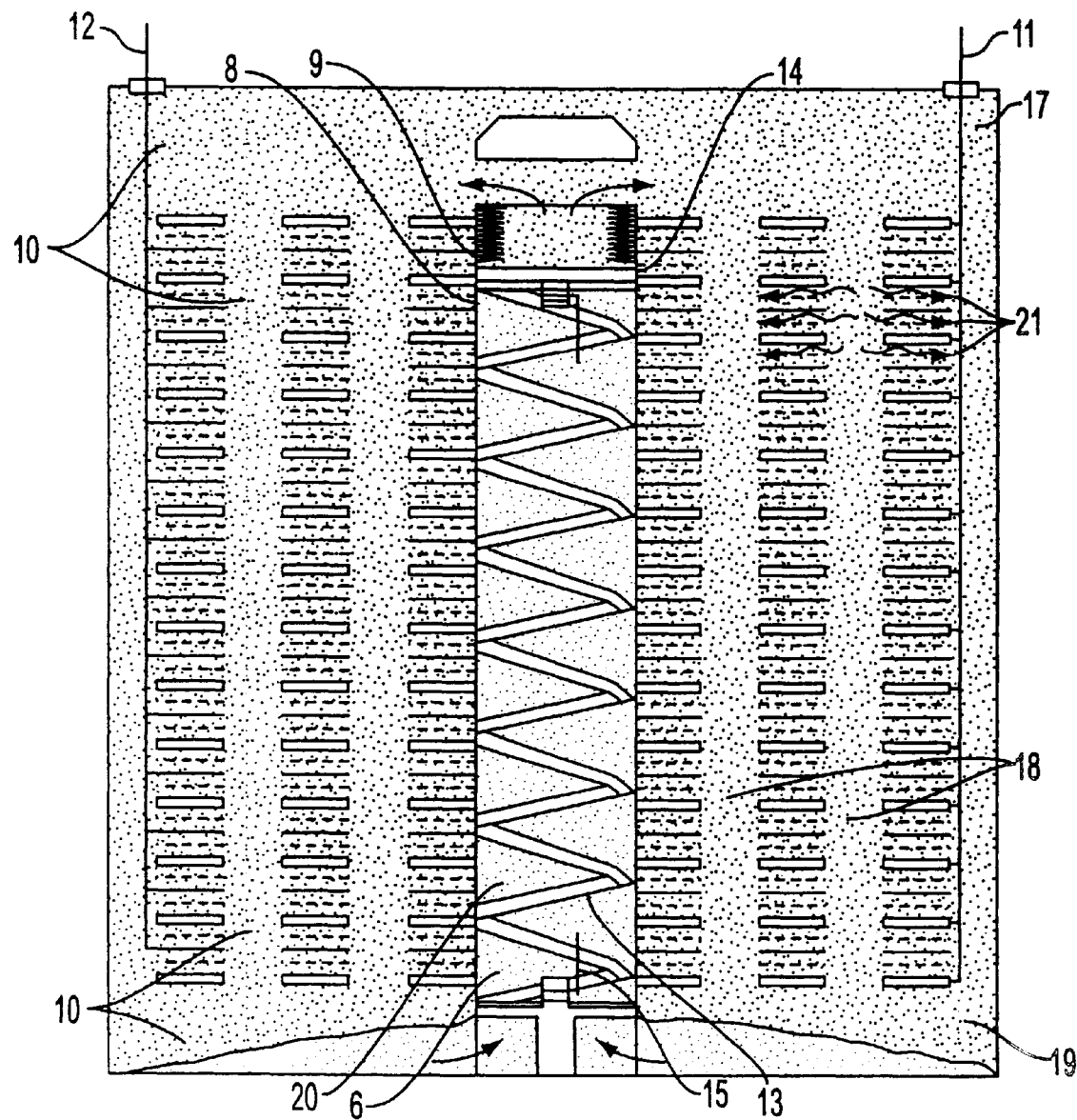
FIG. 3 illustrates a cross-sectional side view of the first embodiment of the invention in a post-activation state.

FIG. 3 illustrates a cross-sectional side view of the first embodiment of the invention in a post-activation state, which occurs after the mid-activation state illustrated in FIG. 2. The spring 13 is fully extended, and the container 9 is fully compressed. The spring 13 continues to apply sufficient force to the piston 14 to maintain the piston 14 at the top of the cylinder 8. The electrolyte 6 has filled the region 20. The additive 10 has flowed into the upper manifold 17, the vertical channels 18, and the lower manifold 19. The additive 10 combines with the electrolyte 6 by diffusion from the vertical channels 18 into the plate stack, as indicated in FIG. 3 by the arrows 21.

Regarding the diffusion into the lower manifold 19 and the region 20, an equilibrium is eventually reached so that the mixed electrolyte throughout the battery is the same consistency. This equilibrium, however, does not affect the high current capability of the battery because a high enough concentration of the additive 10 is used to support the desired high current. The initial volume of the additive 10 in the container 9 is enough to fill the vertical channels 18 in the plate stack, the upper manifold 17, and the lower manifold 19. The volume of the upper and lower manifolds is minimized. The amount of diffusion of the additive 10 into the electrolyte 6 displaced into the region 20 by the action of the piston 14 eventually dilutes the altered electrolyte in the plate stack, but not to the point of adversely affecting the performance of the battery.

After the additive 10 has fully mixed with the electrolyte 6, a new mixed acidic electrolyte composition is formed and has a molarity, from an acidic point of view, which is weaker than the additive 10 but much stronger (i.e., more acidic) than the electrolyte 6.

In the post-activation state, the electrolyte 6 and the additive 10 combine to create an acidic electrolyte. The acidic electrolyte removes the passivation layers accumulated on the lithium electrodes. The acidic electrolyte is a highly conductive electrolyte and, with the cleaned electrodes, provides a high power mode for the battery 1.

The high power mode provides a current greater than the current provided by the low power mode. The duration of the high power mode is not long because the acidic electrolyte is capable of delivering high current, but also is highly corrosive and destroys the active materials of the electrodes. Because the bimodal battery can be stored for a long time, the low power mode can have a duration much greater than the duration of the high power mode.

The invention is described as "bimodal" because the unique nature of the activation of the battery allows the battery of the invention to operate as a low drain, long shelf life battery, prior to activation in the low power mode, and as a high drain, short duration battery, after activation in the high power mode.

The volume of container 9 is approximately equal to the combined volumes of the vertical channels 18, the upper manifold 17, and the lower manifold 19. In the post-activation state, the majority of the additive 10 is in the vertical channels 18. The volume of the upper and lower manifolds is small relative to the volume of the vertical channels. The volume of the electrolyte 6 is much greater than the volume of the additive 10.

Because the piston 14 pushes the additive 10 into the vertical channels 18 and draws the electrolyte 6 into the region 20, no void volume, or empty space, is created in the battery 1. The activation of the battery 1 is a movement of a constant volume of liquid through the battery.

This first embodiment is preferred for use in applications where activation time is critical and where the combining of the electrolyte 6 and the additive 10 must be swift. The average power output in the low and high power modes, the activation time, the energy stored, etc. depend on the design of the battery, and particularly the size of the additive reservoir relative to the rest of the battery. Typically, activation of the battery can be accomplished in a few seconds, and the power output in the high power mode can be designed to be completely discharged in seconds, minutes, or even hours. The duration of the high power mode is designed depending on the desired application.

Figure 4:
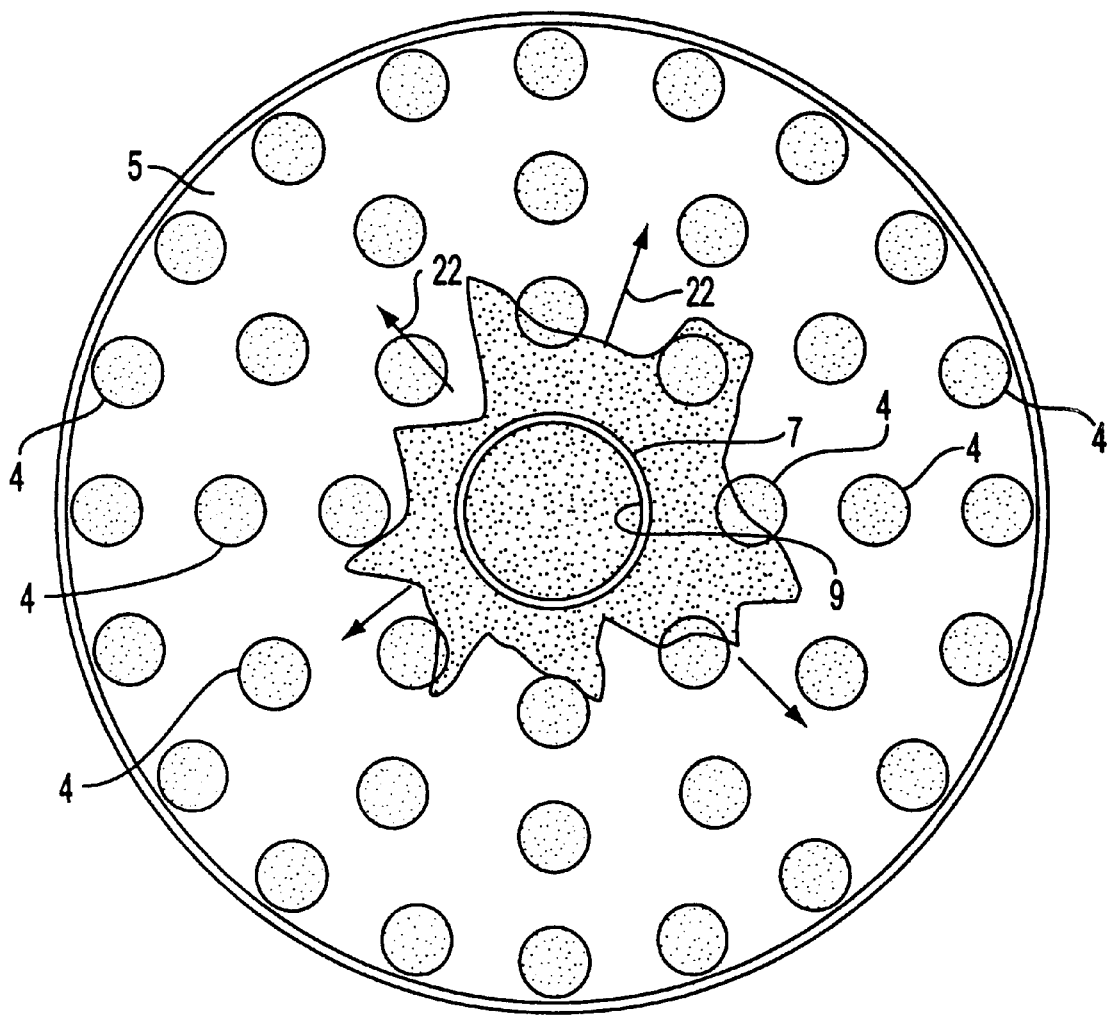
FIG. 4 illustrates a cross-sectional top view of the first embodiment of the invention along dashed line IV—IV of FIG. 2.

FIG. 4 illustrates a cross-sectional top view of the first embodiment of the invention along dashed line IV—IV of FIG. 2. The dashed line IV—IV in FIG. 2 is on the upper surface of the top plate 5. The plate 5 includes numerous apertures 4 and a central aperture 7. The apertures 4 are preferably arranged in a concentric manner to provide for even diffusion of the additive 10 over the plate 5 during mid-activation and post-activation. The arrows 22 indicate the flow of the additive 10 from the container 9 to the apertures 4.

Figure 5:
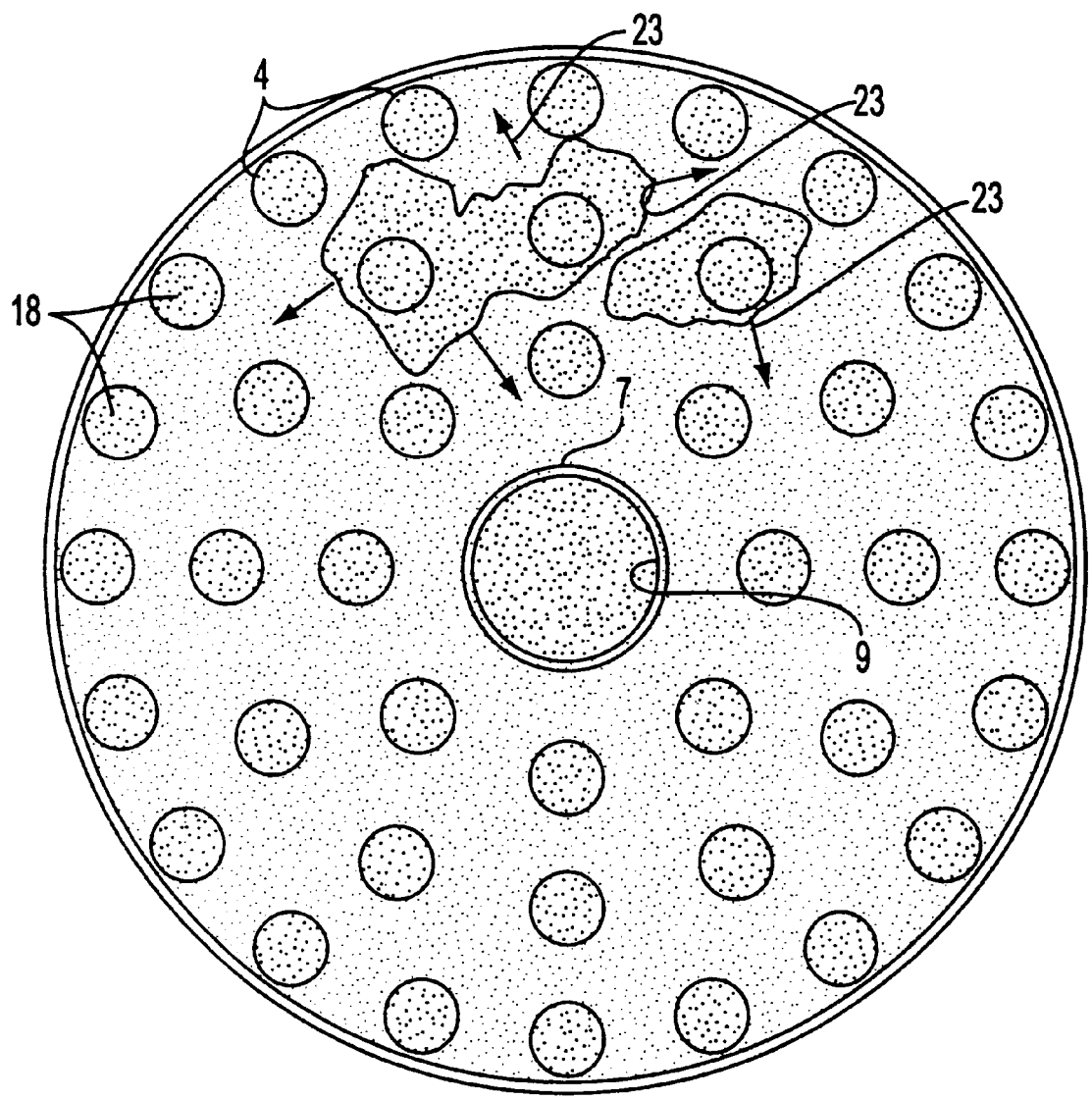
FIG. 5 illustrates a cross-sectional top view of the first embodiment of the invention along dashed line V—V of FIG. 2.

FIG. 5 illustrates a cross-sectional top view of the first embodiment of the invention along dashed line V—V of FIG. 2. The dashed line V—V in FIG. 2 is on the upper surface of a plate 5 within the plate stack. The plate 5 includes numerous apertures 4 and a central aperture 7. The arrows 23 indicate the diffusion of the additive 10 from the vertical channels 18 into the electrolyte 6 located between the plates 5.

Figure 6:
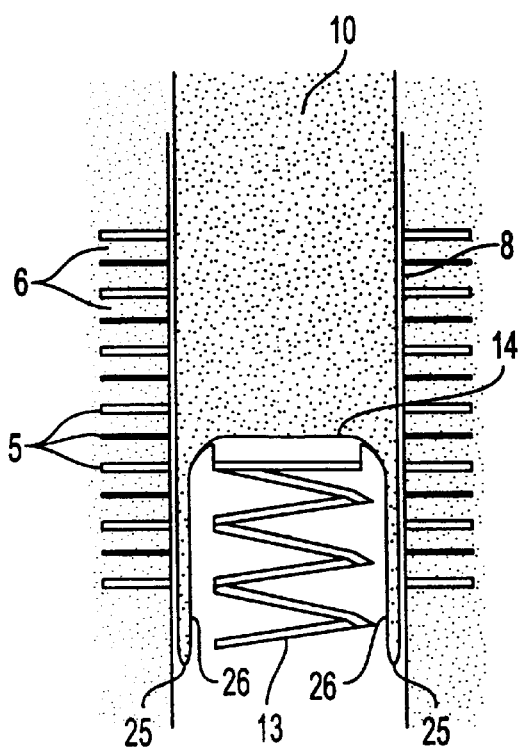
FIG. 6 illustrates an alternative container-piston configuration in a close-up view of a cross-sectional side view of the first embodiment of the invention during mid-activation.

FIG. 6 illustrates a first alternative container-piston configuration in a close-up view of a cross-sectional side view of the first embodiment of the invention during mid-activation. The container 9 in FIGS. 1–3 is replaced by a container 25 that contains the additive 10. The container 25 is a flexible membrane that lines the walls of the central cylinder 8 and rests on the upper surface of the piston 14. As the piston 14 moves upward during activation of the battery, the container 25 folds back on itself, as indicated by reference numerals 26. The container 25 provides a low friction alternative to the container 9 of FIGS. 1–3.

Figure 7:
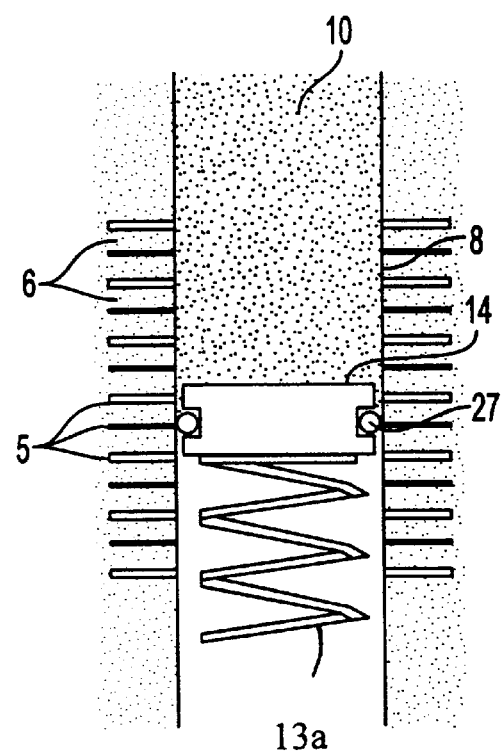
FIG. 7 illustrates another alternative container-piston configuration in a close-up view of a cross-sectional side view of the first embodiment of the invention during mid-activation.

FIG. 7 illustrates a second alternative container-piston configuration in a close-up view of a cross-sectional side view of the first embodiment of the invention during mid-activation. The container 9 is removed, and the central cylinder 8 contains the additive 10. A seal 27 prevents the additive 10 from flowing around the piston 14. The seal 27 is preferably a tight-fitting corrosion-resistant O-ring. During mid-activation of the battery, the piston-container configuration of FIG. 7 acts like a syringe pushing the additive 10 upward and out of the central cylinder 8. With the piston-container configuration of FIG. 7, the spring 13a may require a larger spring constant than the spring 13 used in the embodiments of FIGS. 1–3 and 6. The larger spring constant for the spring 13a may be required to overcome the friction of the piston 14 and the seal 27 required to hold the additive 10 in the central cylinder 8 for long-term storage.

Figure 8:
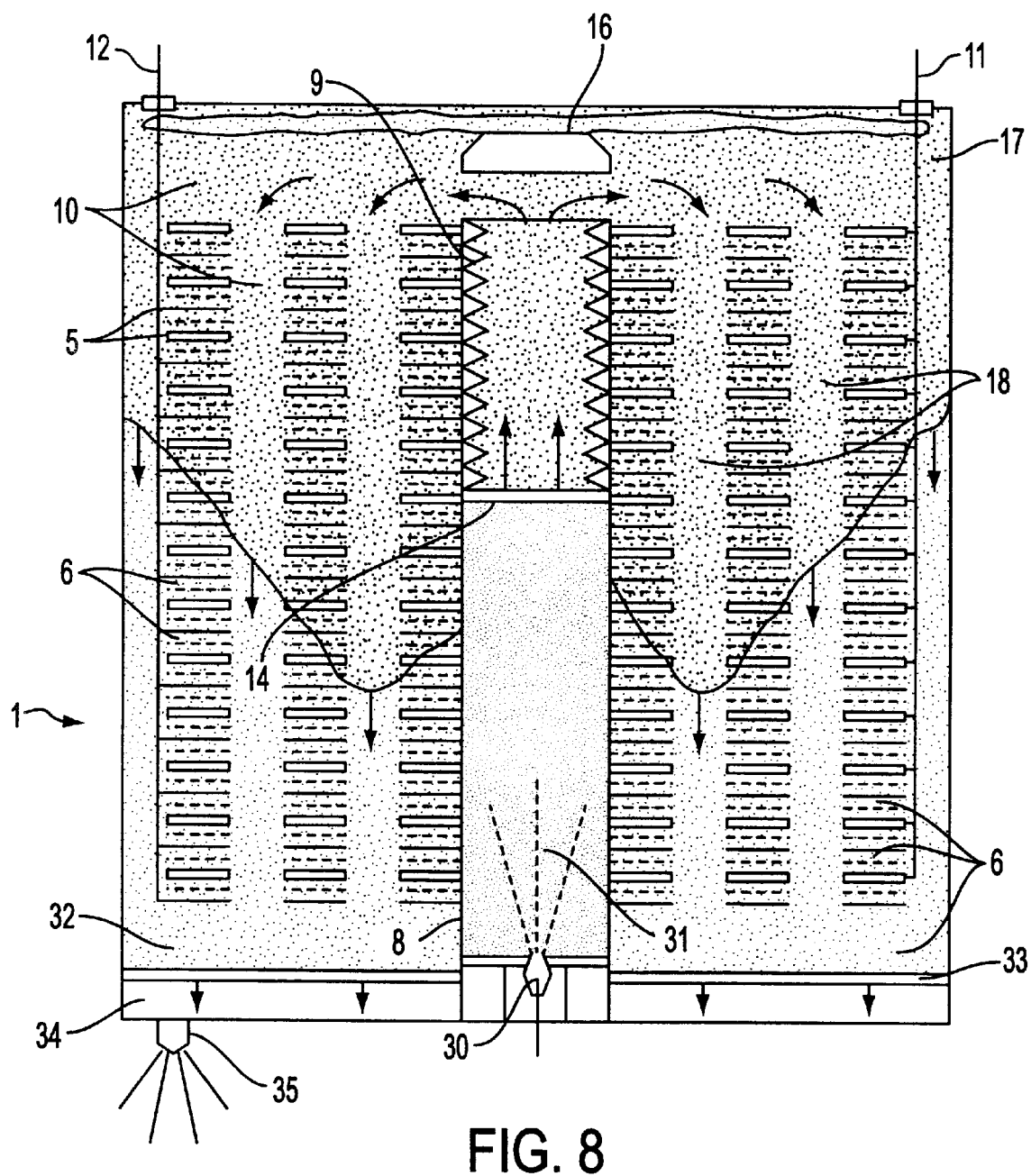
FIG. 8 illustrates a cross-sectional side view of a second embodiment of the invention in a mid-activation state.

FIG. 8 illustrates a cross-sectional side view of a second embodiment of the invention in a mid-activation state. The spring releasing mechanism 15 of the first embodiment is replaced by a piston actuation means in the form of a pyrotechnic device 30. The pyrotechnic device 30 is preferably located at the bottom of the central cylinder 8.

Prior to activating the pyrotechnic device 30, the piston 14 rests against the top of the pyrotechnic device 30. The additive 10 is contained in the container 9, as in the first embodiment, and the electrolyte 6 occupies the upper manifold 17 and the plate stack. A movable diaphragm 33 separates a lower expandable manifold 32 from a gas reservoir 34. The lower expandable manifold 32 is located below the lowest plate 5 in the plate stack and may contain some electrolyte 6 prior to activation. The gas reservoir 34 contains a gas which is preferably air. The pressures on both sides of the movable diaphragm 33 are preferably equal.

When the battery 1 is activated to be switched from the low power mode to the high power mode, the pyrotechnic device 30 is ignited and generates gas 31. Because the pressure of gas 31 is greater than the pressure in the container 9, the gas 31 forces the piston 14 upward, as indicated by the upward direction arrows above the piston 14. The upward moving piston 14 compresses the container 9, the pressure release valve 16 opens, and the additive 10 flows into the manifold 17, as indicated in FIG. 8 by the arrows exiting the pressure release valve 16. Comparing the first and second embodiments, the piston 14 is spring-driven in the first embodiment and gas-driven in the second embodiment.

The electrolyte 6 is pushed through the vertical channels 18 into the lower expandable manifold 32, as indicated in FIG. 8 by the downward direction arrows in the manifold 17 and the vertical channels 18. The pressure in the lower expandable manifold 32 becomes greater than the pressure in the gas reservoir 34 due to the force of the additive 10 flowing out of the container 9. A pressure release valve 35 coupled to the gas reservoir 34 releases the increased pressure in the gas reservoir 34 by allowing gas to escape the battery 1.

Figure 9:
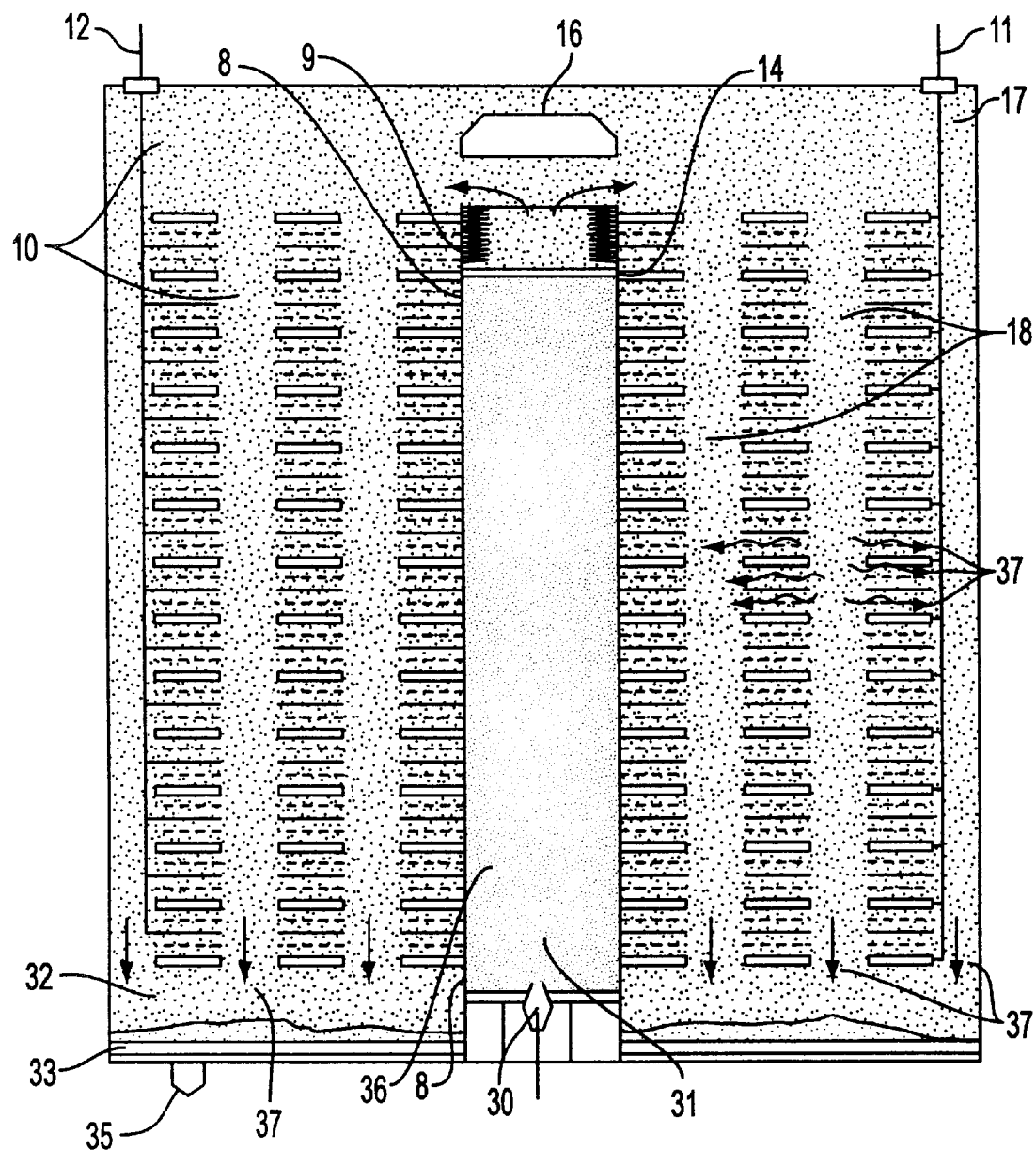
FIG. 9 illustrates a cross-sectional side view of the second embodiment of the invention in a post-activation state.

FIG. 9 illustrates a cross-sectional side view of the second embodiment of the invention in a post-activation state, which occurs after the mid-activation state illustrated in FIG. 8. The piston 14 is at the top of central cylinder 8, and the container 9 is compressed. The additive 10 has flowed into the upper manifold 17, the vertical channels 18, and the lower expandable manifold 32. The additive 10 combines with the electrolyte 6 by diffusion from the vertical channels 18 into the plate stack and by diffusion in the lower expandable manifold 32, as indicated by the arrows 37. The gas reservoir 34 of FIG. 8 has fully contracted and is not shown in FIG. 9. In FIG. 9, the gas has exited from the gas reservoir 34 of FIG. 8 via the pressure release valve 35, and the diaphragm 33 rests against the bottom of the battery. The gas reservoir 34 is empty, and the lower expandable manifold 32 is full.

After activation, a region 36 in the central cylinder 8 and below the piston 14 is created by the displacement of the gas-driven piston 14. The region 36 is filled with the gas from the ignition of the pyrotechnic device 30. The pressure in the region 36 is preferably greater than the pressure in the manifold 17 so that the piston 14 is maintained at the top of the central cylinder 8. Unlike the region 20 in FIG. 3 of the first embodiment, the region 36 does not contain any electrolyte 6.

Although the region 36 is designed to be void of any electrolyte 6 or additive 10, the battery 1 of the second embodiment is unlike the prior art battery, which also has a void volume. In the prior art battery, the plate stack is dry during storage, and all of the electrolyte is stored in a reservoir adjacent to the battery and entirely separate from the battery, or in another embodiment of the prior art, in a reservoir within the interior of the battery.

Because the additive 10 in the battery 1 of the second embodiment is preferably a much smaller volumetric component of the electrolyte 6 permeating the plate stack(for example, 10%–15% of the total volume of the post-activation acidic electrolyte), the casing for the battery 1 of the second embodiment is not substantially larger(for example, 10%–15% larger) than the casing in the first embodiment of the invention. All of the batteries of the embodiments of the invention, however, are substantially smaller (for example, 30%–40% smaller) than the prior art batteries because the void volume remaining in prior art batteries is approximately 50% of the total volume of the battery. In contrast, the void volume remaining for the battery 1 of the second embodiment is only 10%–15% of the total volume of the battery. Further, the prior art batteries cannot provide a low power mode.

Figure 10:
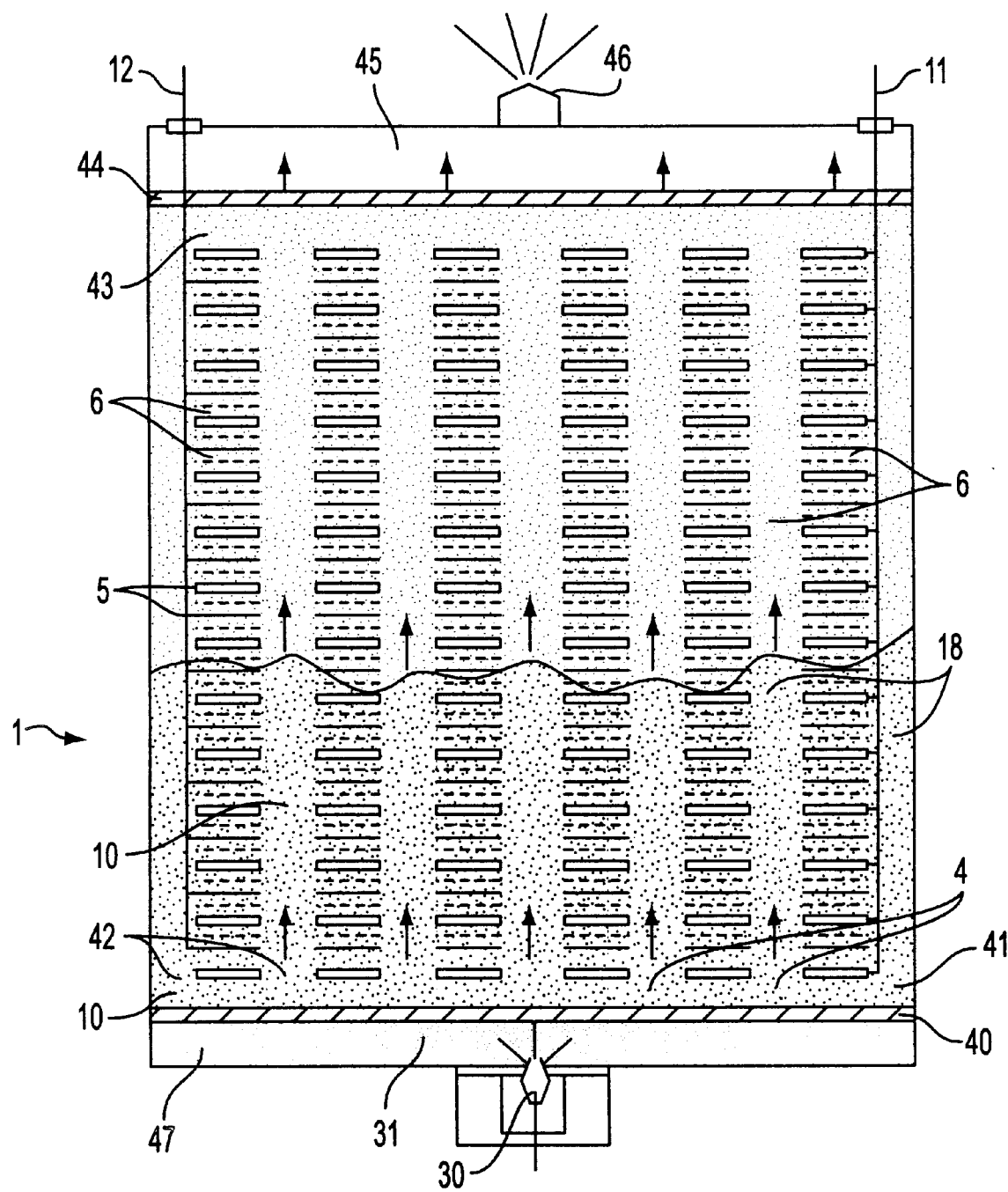
FIG. 10 illustrates a cross-sectional side view of an alternative second embodiment of the invention in a mid-activation state.

FIG. 10 illustrates a cross-sectional side view of a first alternative second embodiment of the invention in a mid-activation state. The pyrotechnic device 30 is located below a piston 40. The cross-sectional area of the piston 40 is equal to the internal cross-sectional area of the battery 1.

Prior to activating the pyrotechnic device 30, the piston 40 rests against the bottom of the casing of the battery 1. The additive 10 is contained in a lower contractible manifold 41. Frangible membranes 42 cover the apertures 4 of the lowest plate 5 and separate the electrolyte 6 in the plate stack from the additive 10 in the lower contractible manifold 41. The frangible membranes 42 are frangible pressure sensitive seals. If the lowest plate 5 in the plate stack does not contact the inside of the casing of the battery, frangible membranes 42 can be used to separate the additive 10 from the electrolyte 6. An upper expandable manifold 43 is located above and next to the highest plate 5 in the plate stack. A movable diaphragm 44 separates any electrolyte 6 in the upper expandable manifold 43 from a gas reservoir 45. The gas reservoir 45 contains a gas, such as air. The pressure on both sides of the movable diaphragm 44 is approximately equal.

When the battery 1 is activated to be switched from the low power mode to the high power mode, the pyrotechnic device 30 is ignited and generates gas 31. Because the pressure of gas 31 is greater than the pressure in the plate stack, the gas 31 forces the piston 40 upward and creates a region 47 between the lower surface of the piston 40 and the bottom of the battery. The upward moving piston 40 increases the pressure in the lower contractible manifold 41, and the frangible membranes 42 are ruptured. The additive 10 flows from the contracting lower contractible manifold 41 through the apertures 4 of the lowest plate in the plate stack and into the vertical channels 18, as indicated in FIG. 10 by the upward direction arrows exiting from the lower contractible manifold 41.

The electrolyte 6 is pushed through the vertical channels 18 into the upper expandable manifold 43, as indicated in FIG. 10 by the upward direction arrows in the vertical channels 18. The pressure in the upper expandable manifold 43 becomes greater than the pressure in the gas reservoir 45 due to the force of the additive 1 0 flowing out of the lower contractible manifold 41. A pressure release valve 46 coupled to the gas reservoir 45 releases the increased pressure in the gas reservoir 45 by allowing gas to escape the battery 1.

Figure 11:
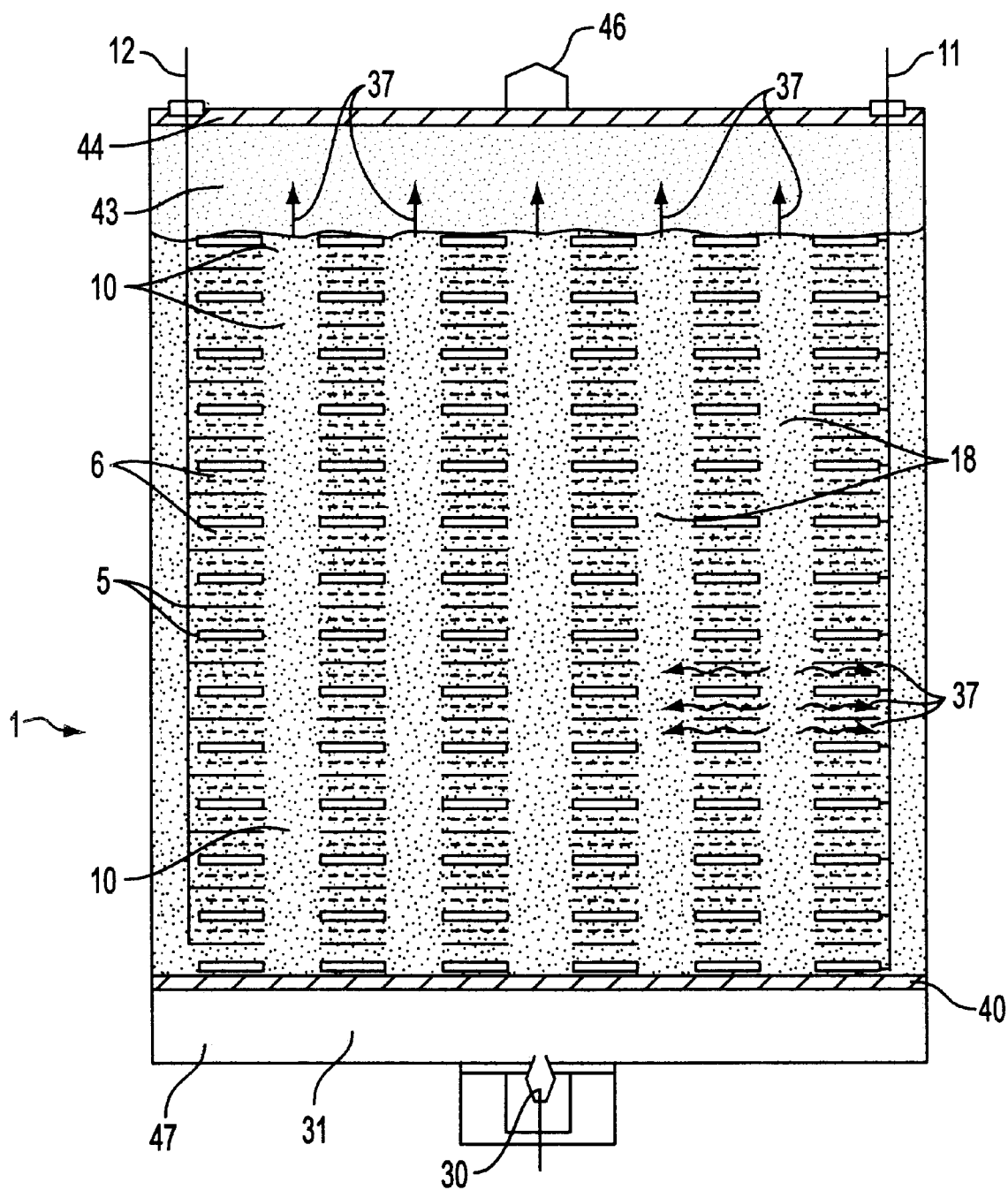
FIG. 11 illustrates a cross-sectional side view of the alternative second embodiment of the invention in a post-activation state.

FIG. 11 illustrates a cross-sectional side view of the first alternative second embodiment of the invention in a post-activation state, which occurs after the mid-activation state illustrated in FIG. 10. The lower contractible manifold 41 of FIG. 10 has fully contracted and is not shown in FIG. 11. The piston 40 is beneath the lowest plate 5 in the plate stack. The additive 10 has flowed into the vertical channels 18 and the upper expandable manifold 43. The additive 10 combines with the electrolyte 6 by diffusion from the vertical channels 18 into the plate stack and by diffusion in the upper expandable manifold 43, as indicated in FIG. 11 by arrows 37. The gas has exited from the gas reservoir 45 via the pressure release valve 46, and the diaphragm 44 rests against the top of the battery 1. The gas reservoir 45 is empty, and the upper expandable manifold 43 is full.

After activation, the region 47 is created by the displacement of the gas-driven piston 40. The region 47 is filled with the gas from the ignition of the pyrotechnic device 30. The pressure in the region 47 is greater than the pressure in the plate stack so that the piston 40 is maintained against the lowest plate 5 in the plate stack.

Figure 19:
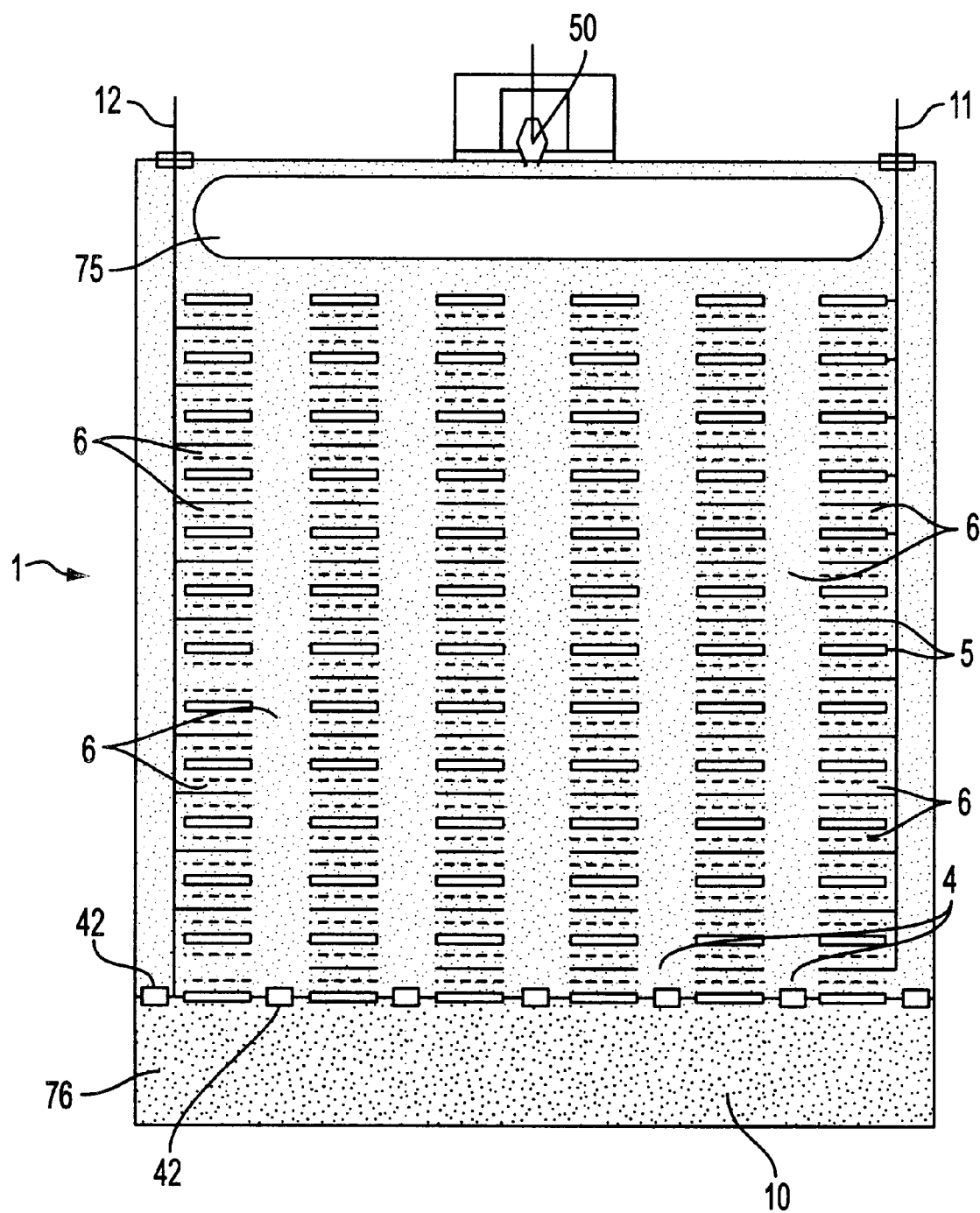
FIG. 19 illustrates a cross-sectional side view of the second embodiment of the invention using a frangible container having a vacuum in a pre-activation state.
Figure 20:
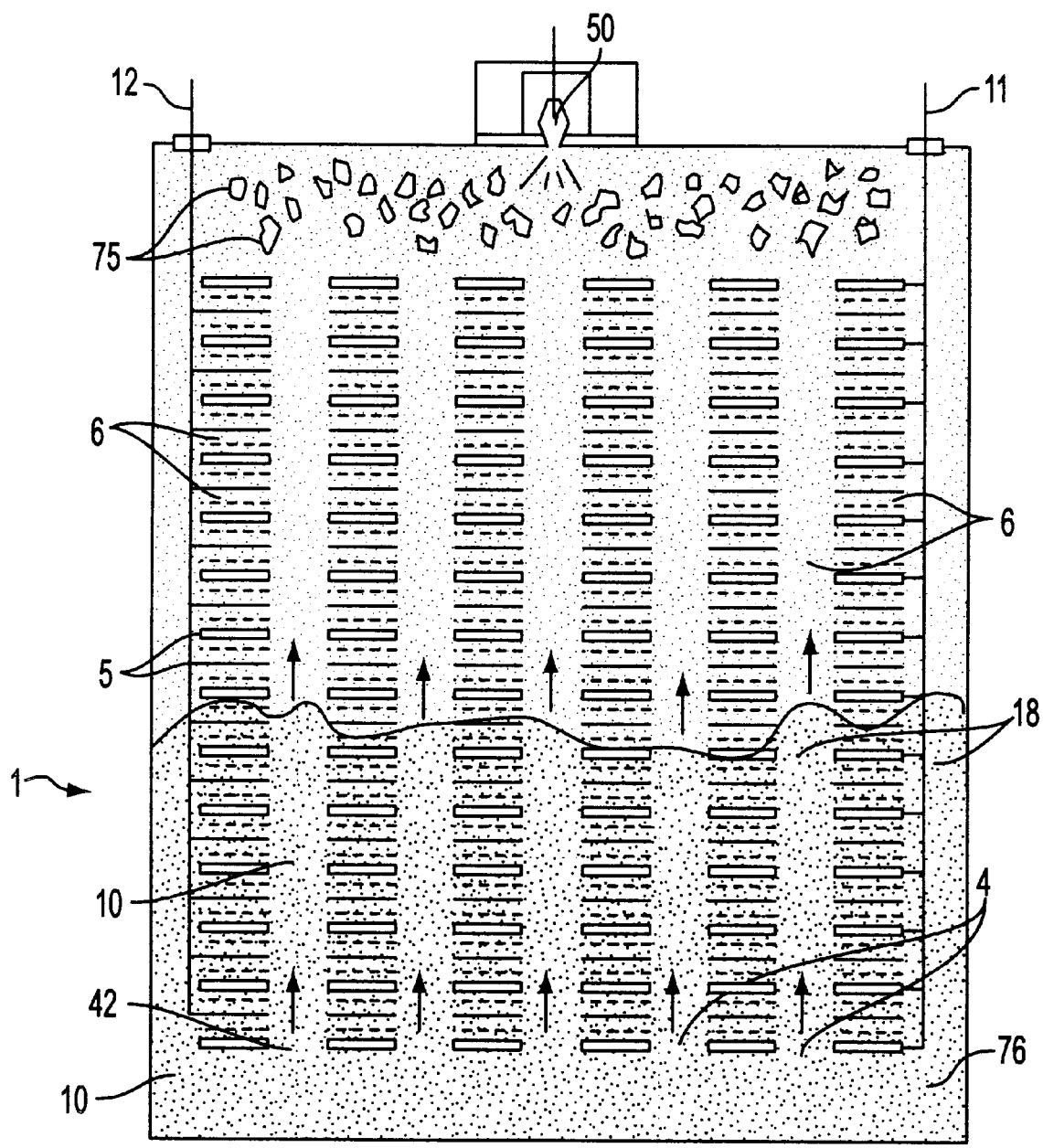
FIG. 20 illustrates a cross-sectional side view of the second embodiment of the invention using a frangible container having a vacuum in a mid-activation state.

FIGS. 19 and 20 illustrate a second alternative second embodiment for the second embodiment illustrated in FIGS. 8–11. The expandable manifold 32, the gas reservoir 34, and the release valve 35 in FIGS. 8 and 9 and the expandable manifold 43, the gas reservoir 45, and the release valve 46 in FIGS. 10 and 11 are replaced by a frangible evacuated chamber 75 occupying the space of the full gas reservoir 34, 45.

FIG. 19 illustrates a cross-sectional side view of the second alternative second embodiment of the invention in a pre-activation state. The additive 10 is contained in a lower manifold 76. Frangible membranes 42 cover the apertures 4 of the lowest plate 5 and separate the electrolyte 6 in the plate stack from the additive 10 in the lower manifold 76. The frangible membranes 42 are frangible pressure sensitive seals.

FIG. 20 illustrates a cross-sectional side view of the second alternative second embodiment of the invention in a mid-activation state, which occurs after the pre-activation state illustrated in FIG. 19. A pyrotechnic device 50 breaks the frangible chamber 75 using an exploding squib, for example. The pyrotechnic device 50 is discussed further in the discussion of the third embodiment below. The broken frangible chamber 75, since air has been evacuated therefrom, creates a pressure difference and draws the displaced electrolyte 6 into the space occupied by the frangible chamber 75. The pressure difference causes the frangible membranes 42 to rupture, and the additive 10 is drawn from the lower manifold 76 into the plate stack. With the alternative second embodiment, it is no longer necessary to expel gas through a release valve 35, 46.

As an alternative to rupturing the frangible container 75 with the pyrotechnic device 50, a piston 40 and a pyrotechnic device 30 as in FIGS. 10 and 11 can be used. The lower manifold 76 is replaced with the lower contractible manifold 41 and the region 47. Upon activation, the pyrotechnic device 30 is ignited and forces the piston 40 upward. The increased pressure in the lower contractible manifold 41 ruptures the frangible membranes 42 and forces the additive 10 from the lower contractible manifold 41 into the plate stack. The increased pressure in the plate stack from the electrolyte 6 ruptures the frangible container 75.

As an alternative to rupturing the frangible container 75 with a pyrotechnic device, the frangible container 75 can be ruptured in other ways, as will be recognized by those skilled in the art. For example, through appropriate design, the frangible container 75 can be ruptured by striking the battery against a hard surface.

Figure 12:
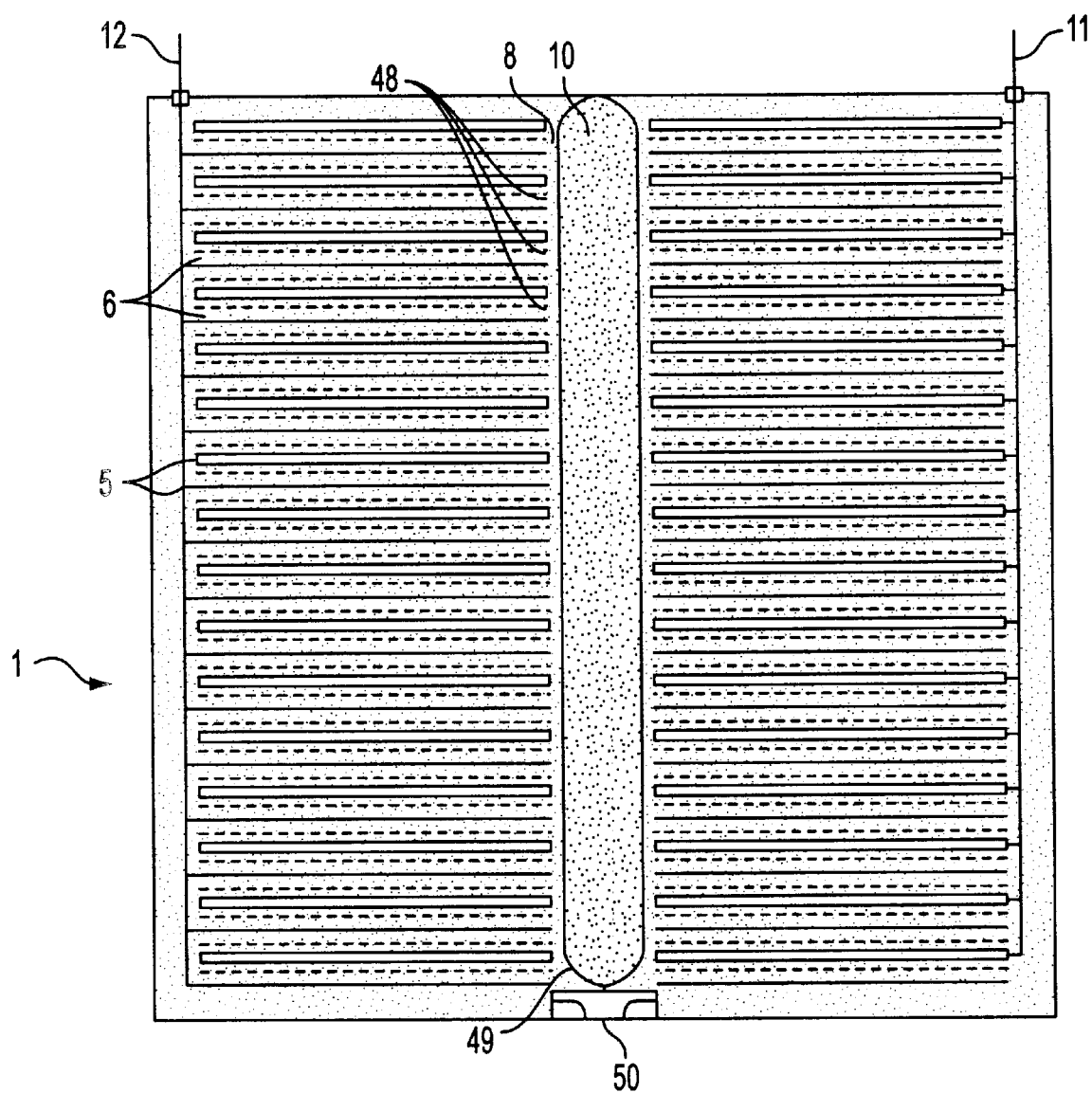
FIG. 12 illustrates a cross-sectional side view of a third embodiment of the invention in a pre-activation state.

FIG. 12 illustrates a cross-sectional side view of a third embodiment of the invention in a pre-activation state. The pyrotechnic device 50 is a percussion cap or small encased piston driven by a small explosive. The pyrotechnic device 50 ruptures a frangible container 49 upon ignition and breaks the frangible container 49.

The pyrotechnic device 50 for the third embodiment is designed to create a shock wave to fracture the container. The pyrotechnic device 50 contains a chemical composition that detonates. In contrast, the composition of the gas generator pyrotechnic device 30 in the second embodiment has a chemical formulation more like a rocket propellant which burns and does not detonate.

The central cylinder 8 contains apertures 48 between each plate 5 in the plate stack. A frangible container 49 resides in the central cylinder 8 and contains the additive 10. The frangible container 49 is preferably an ampule made from a frangible material, such as glass, ceramic, or plastic, and can be ruptured from the ignition of the pyrotechnic device 50.

Figure 13:
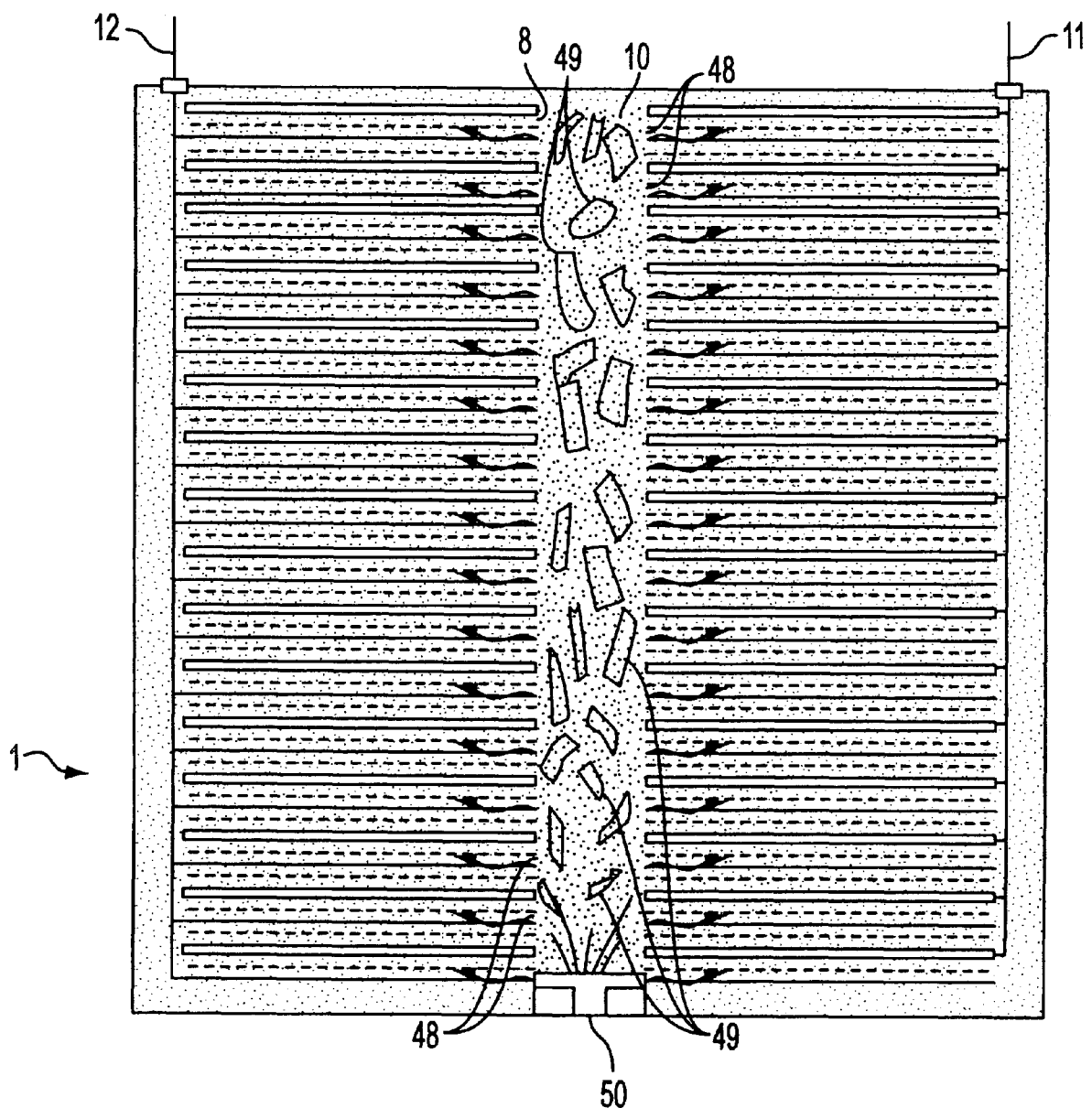
FIG. 13 illustrates a cross-sectional side view of the third embodiment of the invention in a mid-activation state.

FIG. 13 illustrates a cross-sectional side view of the third embodiment of the invention in a mid-activation state, which occurs after the pre-activation state illustrated in FIG. 12. When the battery 1 is activated to be switched from the low power mode to the high power mode, the pyrotechnic device 50 is ignited. The force of the ignition ruptures the frangible container 49. The additive flows out of the ruptured frangible container 49 and into the central cylinder 8. The additive 10 combines with the electrolyte 6 via diffusion through the apertures 48 in the central cylinder 8 and into the plate stack, as indicated by the arrows in FIG. 13. Any residual gas from the pyrotechnic device 50 is absorbed into the surrounding electrolyte and additive.

The third embodiment relies on passive combining via diffusion of the additive 10 and the electrolyte 6 rather than on active combining via injection of the additive 10 into the electrolyte 6 through the vertical channels 18, as in the first and second embodiments. This passive combining can lead to a longer activation time than with the first and second embodiments. Hence, the third embodiment is useful if the activation time of the high power mode is not critical to the apparatus using the battery 1.

In the third embodiment, the additive 10 can be in the form of a dry powder (for example, $LiCl/LiAlCl_4$ salt) as well as a liquid or slurry because the dispersal method of the additive 10 into the balanced electrolyte 6 is through simple diffusion. In the other embodiments of the invention, the additive 10 is pumped under pressure into the plate stack, necessitating the use of a liquid or slurry.

Figure 14A:
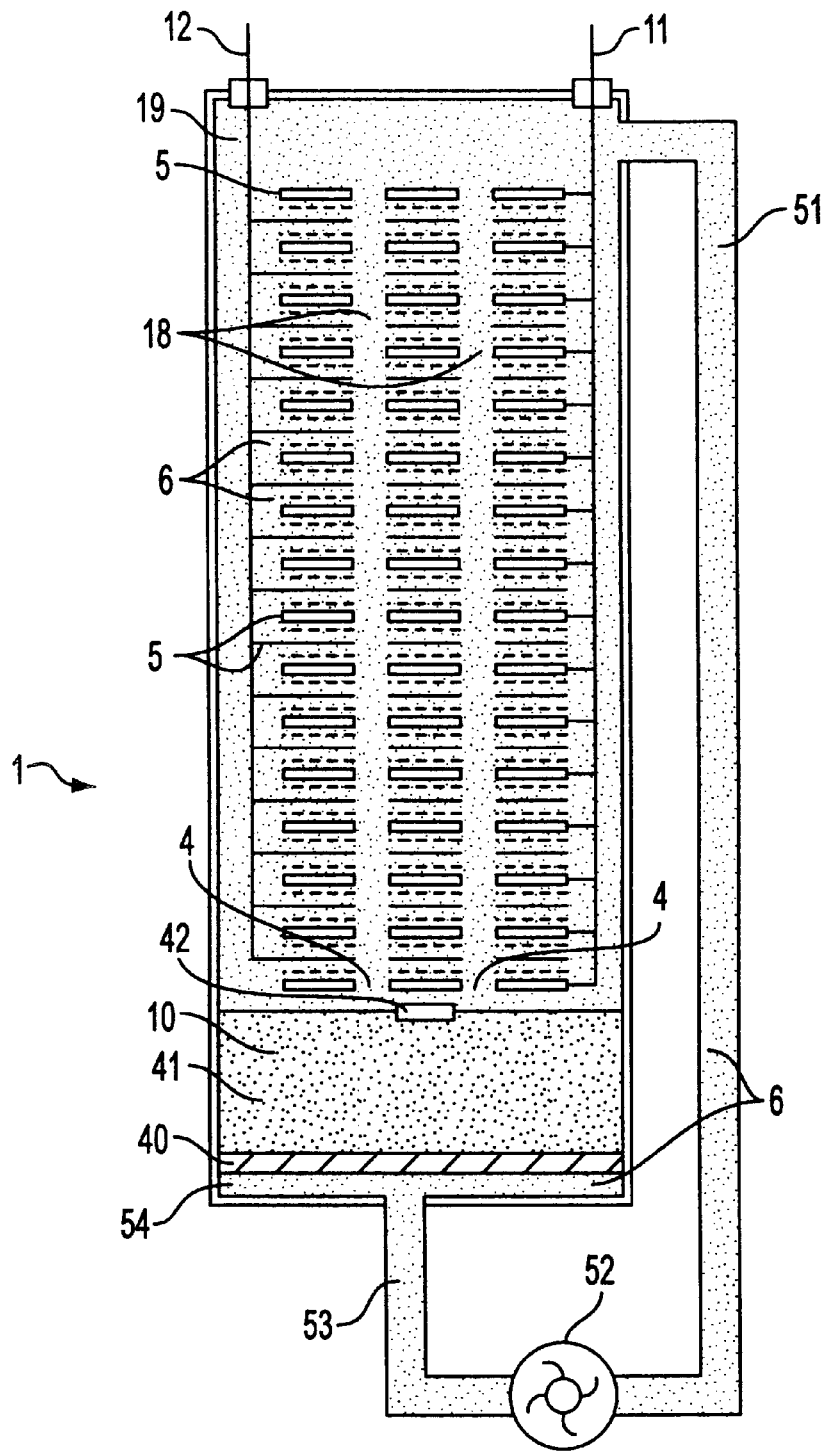
FIG. 14(a) illustrates a cross-sectional side view of a fourth embodiment of the invention in a pre-activation state.

FIG. 14(a) illustrates a cross-sectional side view of a fourth embodiment of the invention in a pre-activation state. Prior to activating the bimodal battery 1, the piston 40 rests against the bottom of the battery 1. The cross-sectional area of the piston 40 is equal to the internal cross-sectional area of the battery 1. The additive 10 is contained in a lower contractible manifold 41. A frangible membrane 42 separates the additive 10 in the lower contractible manifold 41 from the electrolyte 6 in the plate stack. An upper manifold 19 is located above the highest plate 5 in the plate stack.

A return line 51 couples the upper manifold 19 to a pump 52. The pump 52 is a motor-driven impeller pump. A supply line 53 couples the pump 52 to an expandable reservoir 54. The return line 51, the pump 52, and the supply line 53 are primed with the electrolyte 6. The pressure in the return line 51 is equal to the pressure in the supply line 53. The pump 52 can be located either inside or outside of the casing of the battery 1.

Figure 14B:
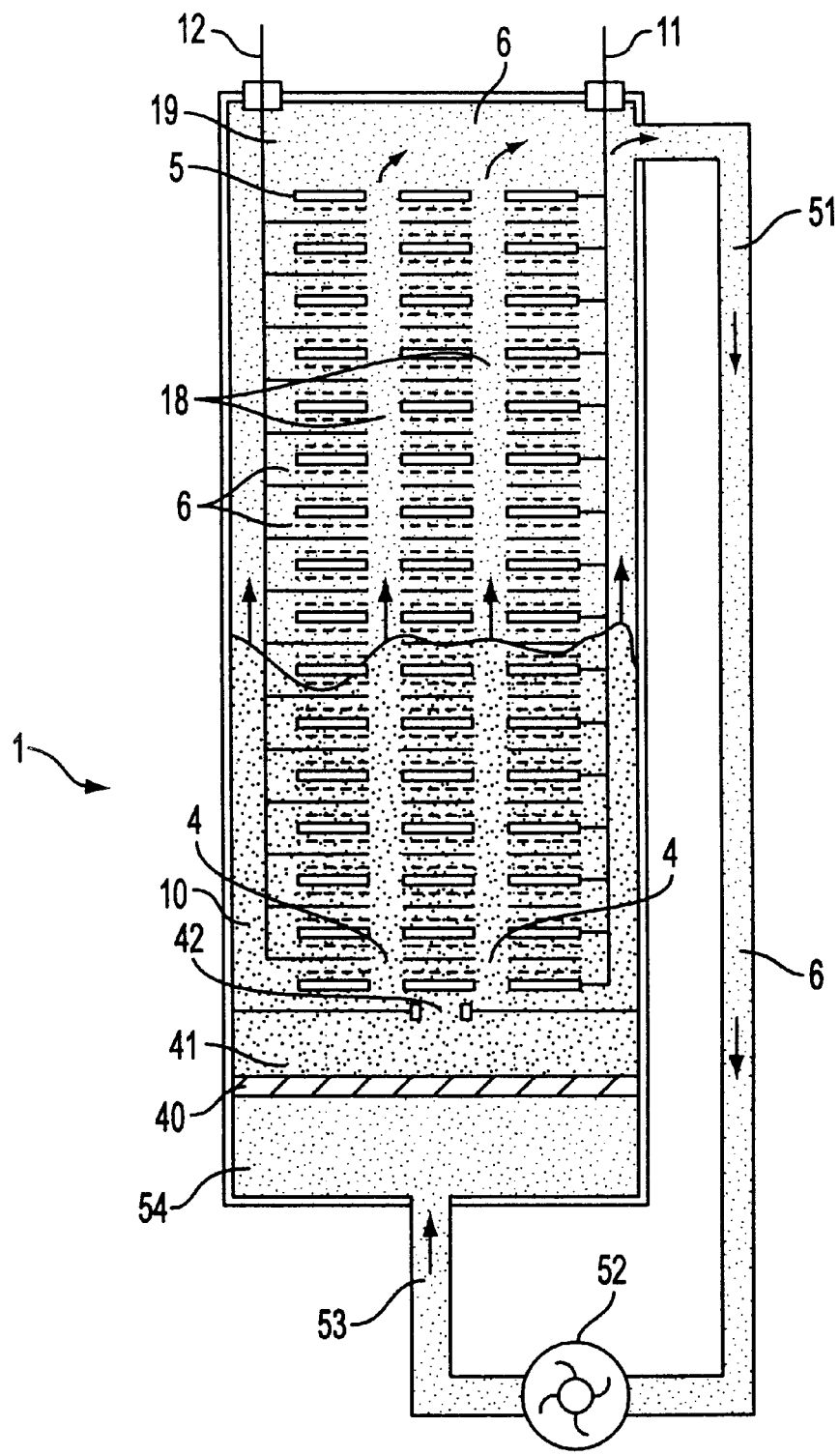
FIG. 14(b) illustrates a cross-sectional side view of a fourth embodiment of the invention in a mid-activation state.

FIG. 14(b) shows the fourth embodiment of the battery in a mid-activation state, which occurs after the pre-activation state illustrated in FIG. 14(a). When the battery 1 is activated to be switched from the low power mode to the high power mode, the pump 52 is turned on. The pump 52 circulates the electrolyte 6 from the return line 51 to the supply line 53 and pumps the electrolyte 6 from the supply line 53 into the expandable reservoir 54. The pressure in the expandable reservoir 54 increases and pushes the piston 40 upward towards the plate stack. The upward moving piston 40 increases the pressure in the lower contractible manifold 41, and the frangible membrane 42 is ruptured.

The additive 10 flows from the contracting lower contractible manifold 41 through the apertures 4 of the lowest plate 5 in the plate stack and into the vertical channels 18. The electrolyte 6 in the plate stack is pushed through the vertical channels 18 into the upper manifold 19. The electrolyte 6 in the upper manifold 19 is pushed into the return line 51 and to the pump 52, as indicated by the arrows in the upper manifold 19 and along the return line 51.

In a post-activation state, the pump 52 is turned off when the lower contractible manifold 41 is emptied of the additive 10. The additive 10 in the vertical channels 18 diffuses into the electrolyte 6 located between the plates 5 in the plate stack.

If a large current is required for the high power mode of the bimodal reserve battery, a large battery is needed. To efficiently combine the electrolyte 6 and the additive 10 in a large battery, the fourth embodiment is preferred over the other embodiments because of the ability of the pump 52 to inject the additive 10 into the plate stack.

Instead of a motor-driven impeller pump as the pump 52, the pump 52 can be any suitable pumping device that is able to circulate the electrolyte 6. Examples of such pumping devices include a motor-driven piston, a motor-driven diaphragm, and a turbo-pump.

The invention illustrated in FIGS. 1–14 is a cylindrical configuration. However, other geometric shapes can be used to implement the invention. For example, instead of a circular cross-section, as illustrated in FIGS. 4 and 5, the invention can be implemented with a rectangular or square cross-section. As those skilled in the art will recognize, any geometric shape can be used, and the geometric shape chosen will depend on the apparatus with which the battery is designed to be used.

Figure 15A:
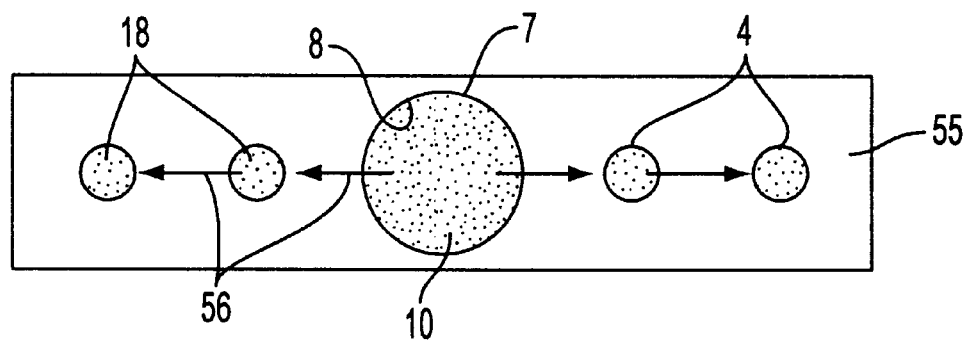
FIGS. 15(a)–15(c) illustrate cross-sectional top views of a top plate in a plate stack for various configurations of the invention employing a rectangular cross-section.
Figure 15B:
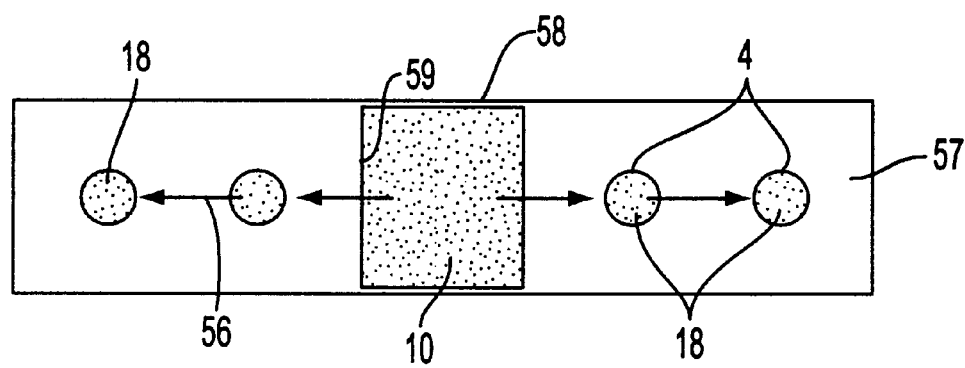
Figure 15C:
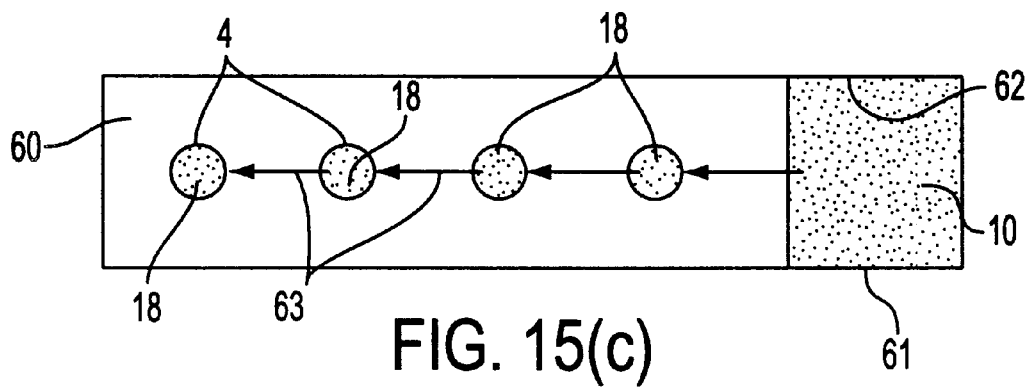

FIGS. 15(a)–15(c) illustrate cross-sectional top views of a top plate in a plate stack for various configurations of the invention employing a rectangular cross-section. FIG. 15(a) illustrates a rectangular plate 55 having apertures 4 for forming the vertical channels 18 and a central circular aperture 7 for forming the central cylinder 8 containing the additive 10. The arrows 56 indicate the flow of the additive 10 from the central cylinder 8 to the vertical channels 18.

FIG. 15(b) illustrates a rectangular plate 57 having apertures 4 for forming the vertical channels 18 and a central rectangular aperture 58 in the middle of the rectangular plate 57. A central hexahedron 59 is formed in the plate stack and passes through the rectangular apertures 58 in each of the plates 57. The central hexahedron 59, like the central cylinder 8 in the first, second, and third embodiments, extends through the plate stack and contains the additive 10. The arrows 56 indicate the flow of the additive 10 from the central hexahedron 59 to the vertical channels 18.

FIG. 15(c) illustrates a rectangular plate 60 having apertures 4 for forming the vertical channels 18 and a central rectangular aperture 61 along a side of the rectangular plate 60. A side hexahedron 62 is formed in the plate stack and passes through the rectangular apertures 61 in each of the plates 60. The side hexahedron 62, like the central cylinder 8 in the first, second, and third embodiments, extends through the plate stack and contains the additive 10. The arrows 63 indicate the flow of the additive 10 from the side hexahedron 62 to the vertical channels 18.

Figure 16A:
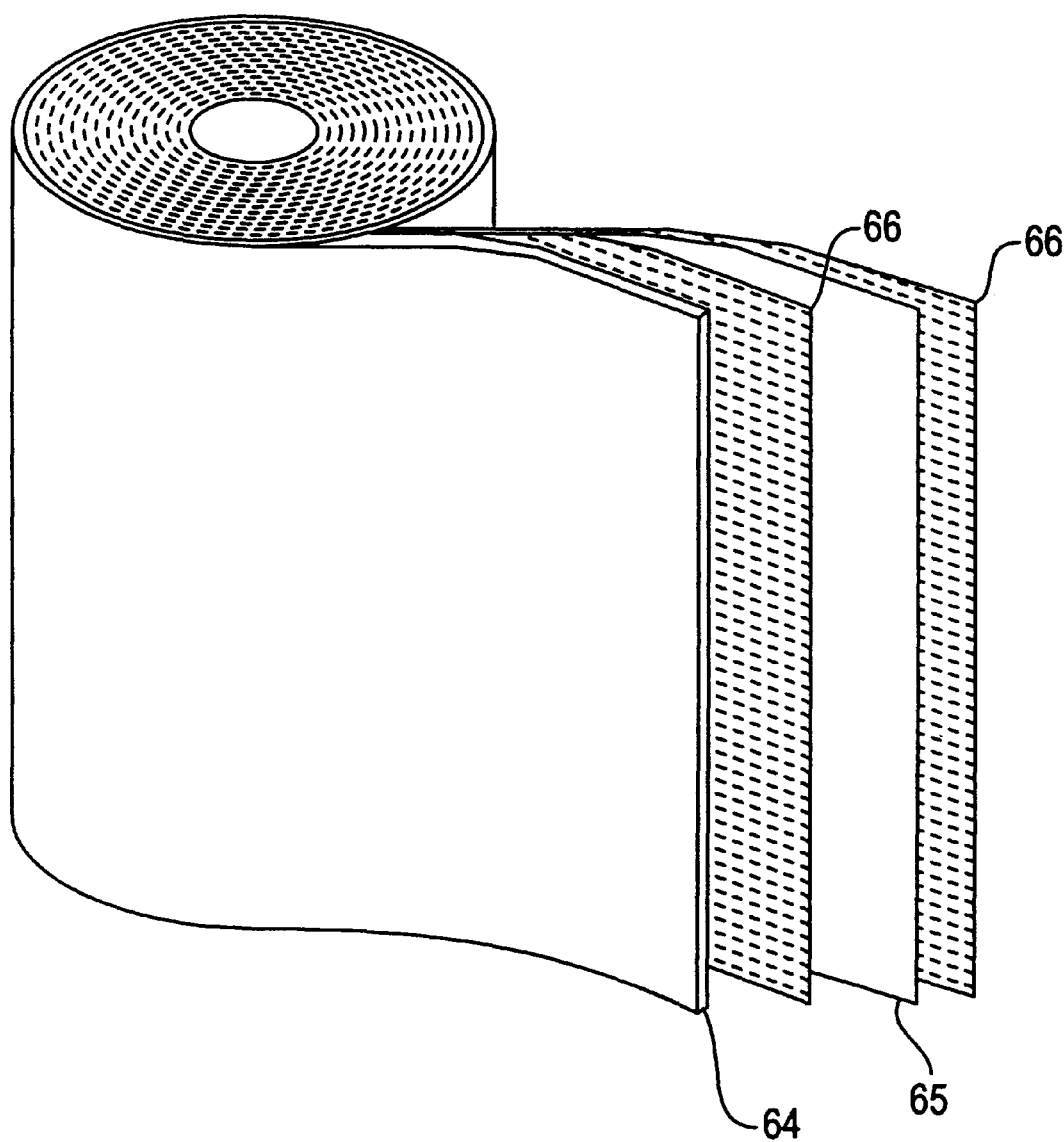
FIG. 16(a) illustrates a jellyroll plate stack configuration.

FIGS. 16(a)–16(d) illustrate a plate stack configuration typically used in commercial "C" and "D" cells and known as a "jellyroll" plate stack configuration. As shown in FIG. 16(a), the jellyroll, includes a positive plate 64, a negative plate 65, and permeable separators 66. In a typical application, these components 64, 65, and 66 are rolled into a cylindrical shape and inserted into a cylindrical battery enclosure.

Figure 16B:
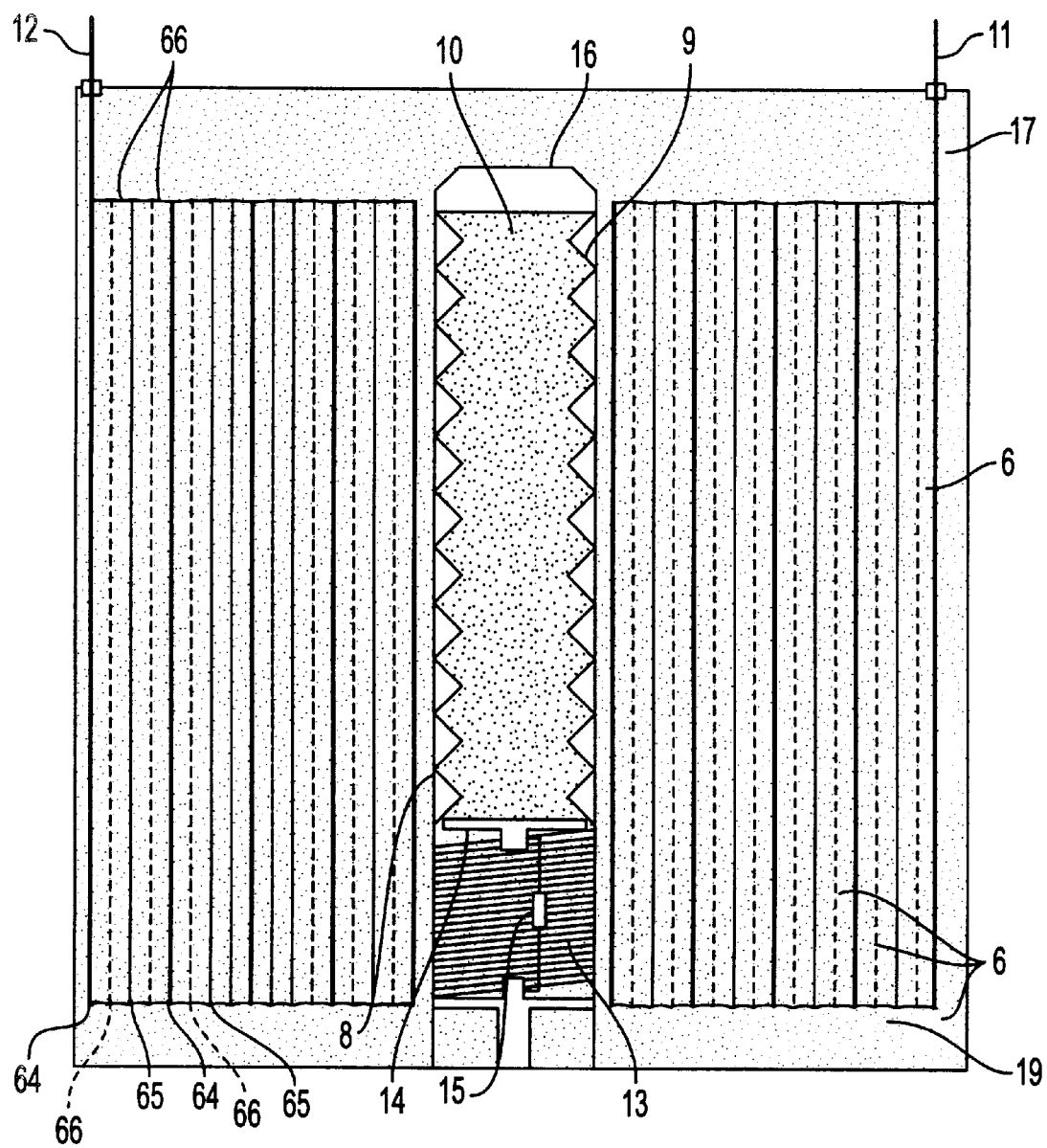
FIGS. 16(b) and 16(c) illustrate cross-sectional side views of the first embodiment of the invention using a jellyroll plate stack configuration in a pre-activation state and a mid-activation state, respectively.
Figure 16C:
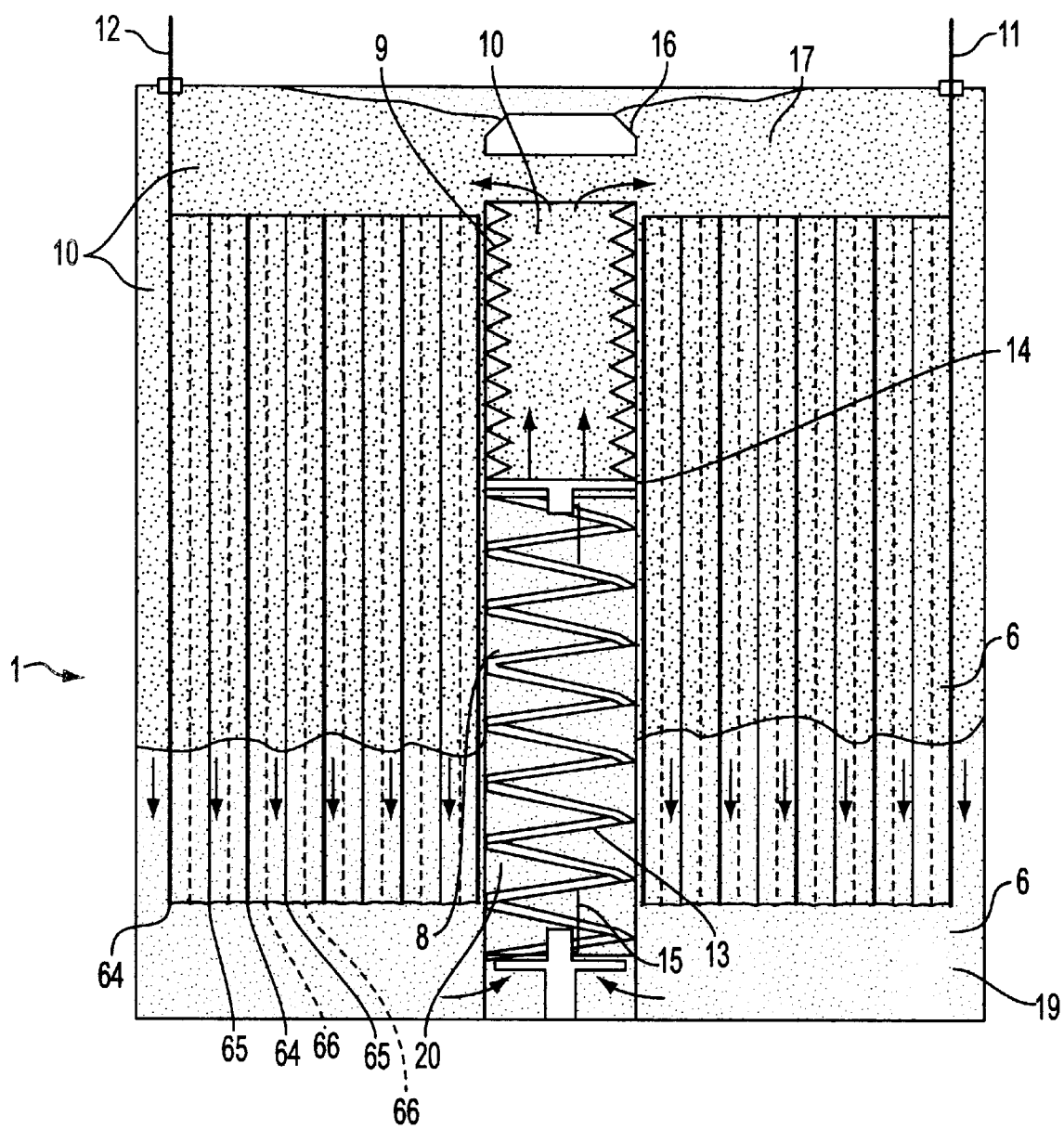

FIGS. 16(b) and 16(c) illustrate the jellyroll plate stack used in the first embodiment in place of the parallel plate stack. In FIG. 16(b), the balanced electrolyte 6 permeates the jellyroll plate stack in a pre-activation state, and in FIG. 16(c), the battery is in a mid-activation state. The mechanism for pumping the additive into the plate stack is the same as that in the first embodiment. The piston 14 compresses the container 9, forcing the release valve 16 to permit the additive 10 to flow into the upper manifold 17 and into the plate stack through the space between plates 64 and 65 occupied by the permeable membrane 66. As with the first embodiment, the displaced electrolyte returns, via the lower manifold 19 at the base of the battery into the region 20 under the piston 14, as shown in FIG. 16(c).

Figure 16D:
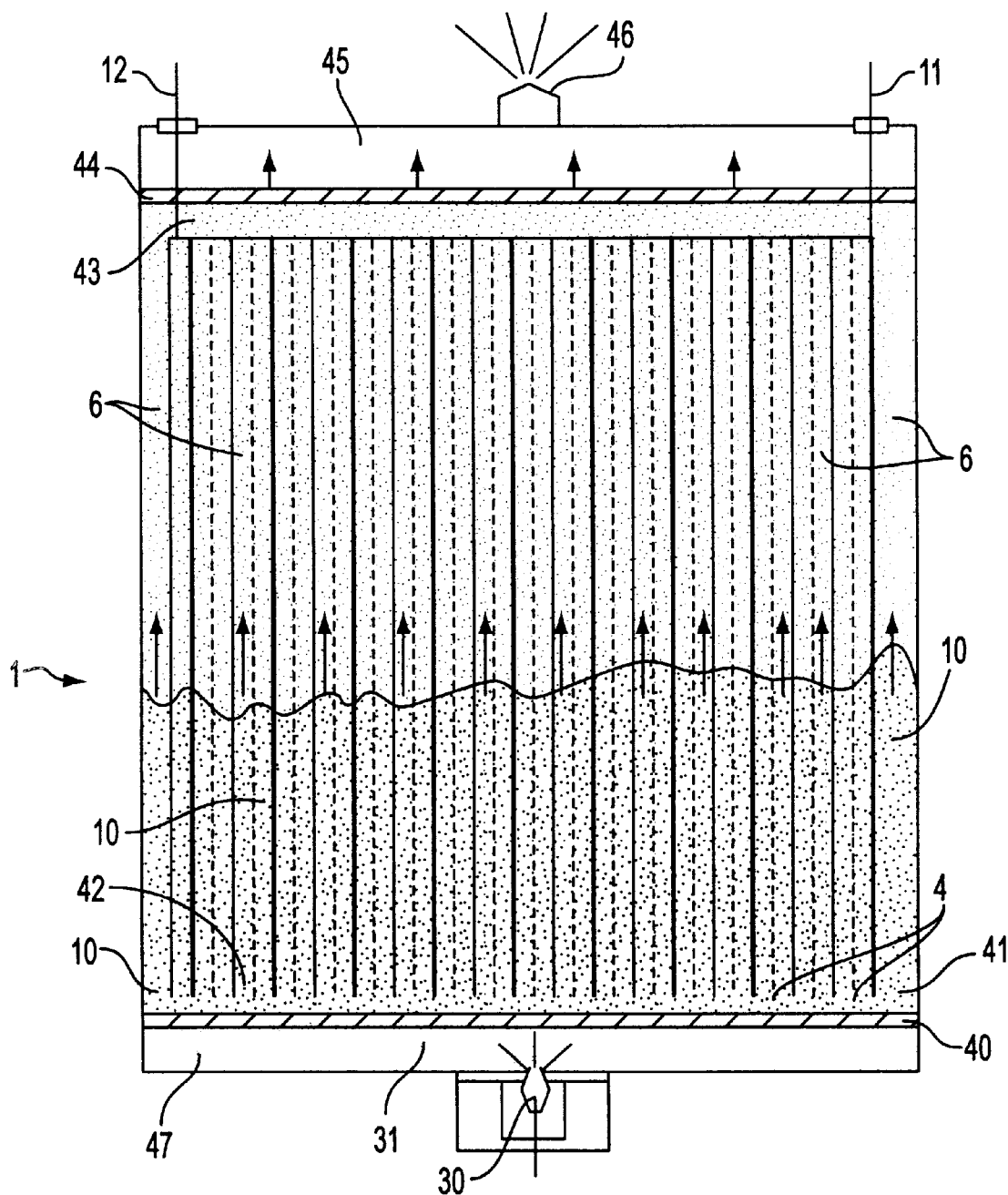
FIG. 16(d) illustrates a cross-sectional side view of the second embodiment of the invention using a jellyroll plate stack configuration in a mid-activation state.

FIG. 16(d) illustrates a battery with the jellyroll plate stack and the gas generator pumping mechanism of the second embodiment in a mid-activation state. The mechanism for pumping the additive into the plate stack is the same as that in the second embodiment. The additive 10 in the lower contractible manifold 41 is pumped via the piston 40 through the plate stack via the spaces in the jellyroll between plates 64 and 65 occupied by the permeable membrane 66. The displaced electrolyte 6 flows into the upper expandable manifold 43, compressing the gas in the gas reservoir 45 and venting the gas through the pressure release valve 46.

Although not shown, a jellyroll plate stack version of the fourth embodiment can be constructed by substituting the jellyroll plate stack for the parallel plates. A jellyroll plate stack version of the third embodiment can be constructed by cutting radial channels into the jellyroll plate stack to aid the diffusion of the additive into the plate stack.

Several chambers containing the additive 10 have been described. Examples of such chambers include: the container 9 in FIG. 1; the container 25 in FIG. 6; the central cylinder 8 in FIG. 7; the lower contractible manifold 41 in FIG. 10; the frangible container 48 in FIG. 12; the central hexahedron 58 in FIG. 15(b); and the side hexahedron 62 in FIG. 15(c). As those skilled in the art will recognize from the description of the invention, the chamber containing the additive can be any design and at any position as determined by the desired bimodal battery design.

Several power mode increasing devices have been described to increase the current output of the bimodal battery from a low power mode to a high power mode. These devices release the additive 10 stored in a chamber and contribute to combining the additive 10 with the electrolyte 6 in the plate stack. Examples of such devices include: the spring releasing mechanism 15, the spring 13, and the piston 14 in FIGS. 1, 6, and 7; the pyrotechnic device 30 and the piston 14 in FIG. 8; the pyrotechnic device 30 and the piston 40 in FIG. 10; the pyrotechnic device 50 in FIG. 12; the pump 52 and the piston 40 in FIG. 14(a); and the pyrotechnic device 50 in FIG. 19. As those skilled in the art will recognize from the description of the invention, the power mode increasing device used in the bimodal battery can be any design and at any position as determined by the desired bimodal battery design.

As those skilled in the art will recognize from the description of the invention, the vertical channels 18 in the plate stack made by the aligned apertures 4 in the electrodes are designed to aid and accelerate distribution of the additive into the plate stack. The aligned apertures and the resulting vertical channels are not essential to movement of the additive into the plate stack but are useful in accelerating the movement of the additive. The aligned holes may be omitted in applications where instantaneous activation is not required or where cost is a factor weighing against incorporation of this feature. Instead, non-aligned apertures can be used, or when no apertures are used, the additive can flow around the plate stack.

Figure 17A:
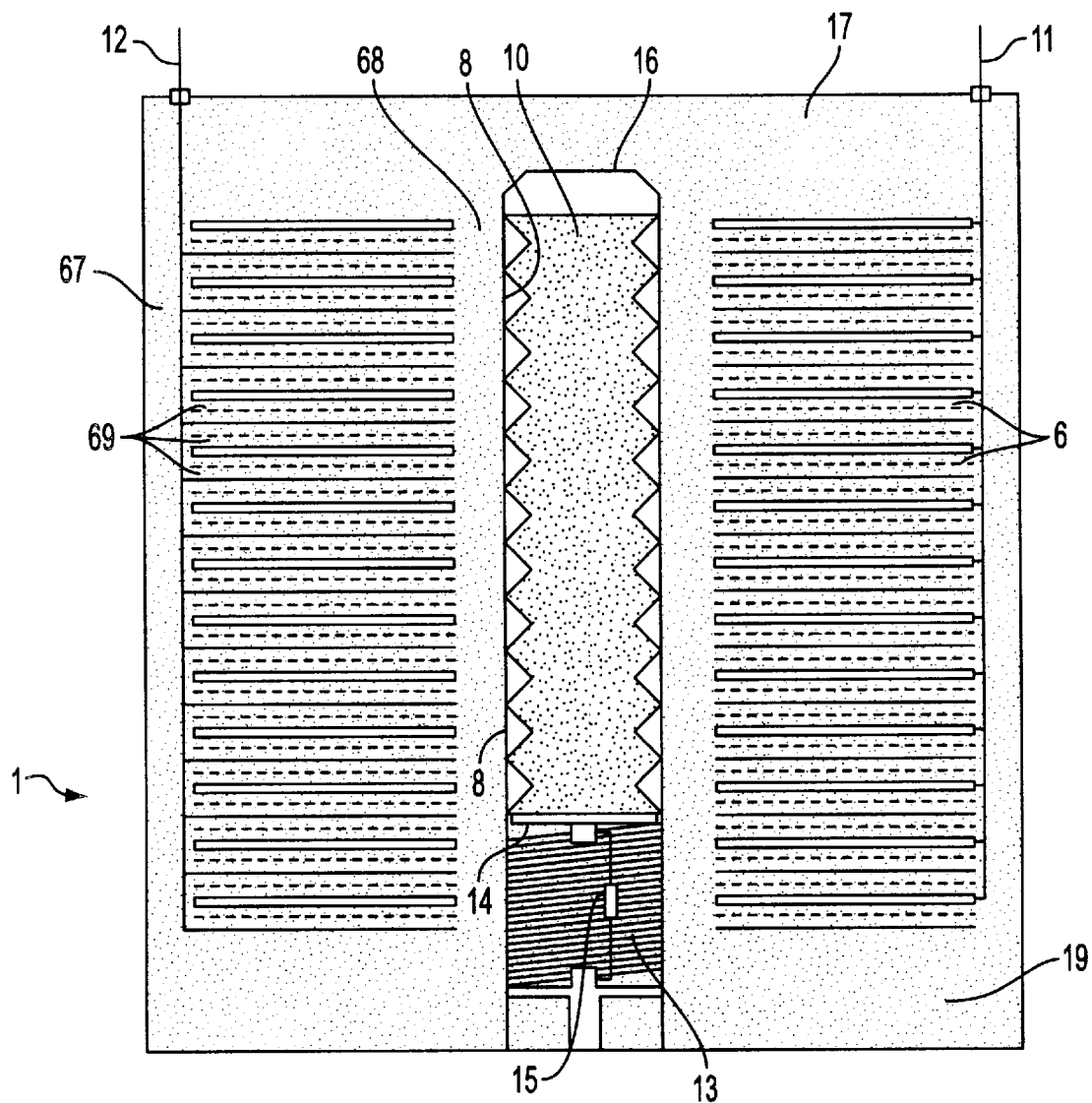
FIGS. 17(a) and 17(b) illustrate cross-sectional side views of the first embodiment of the invention having no internal channels for electrolyte flow in a pre-activation state and a mid-activation state, respectively.
Figure 17B:
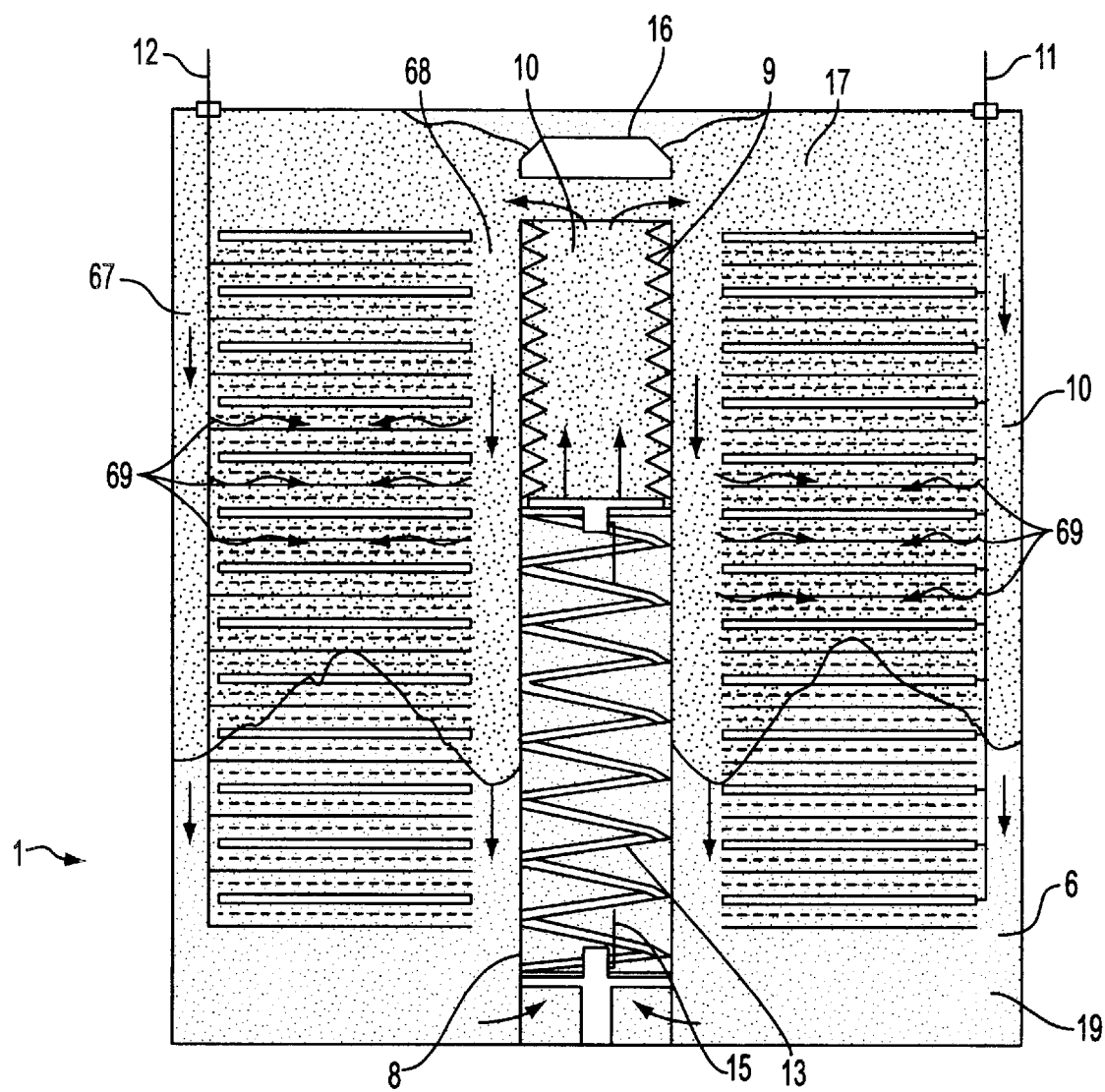

FIGS. 17(a) and 17(b) show a third alternative to the first embodiment in a pre-activation state and in a mid-activation state, respectively. Plates 5 have no apertures 4, and, therefore, no vertical channels 18 exist for the flow of the additive through the interior of the plate stack. With these vertical channels omitted, the additive is distributed through the upper manifold 17, down the outer edge of the plate stack through a space 67 between the inner wall of the casing of the battery and the outer edge of the cylindrical plate stack, and down the interior edge of the plate stack through a space 68 between the interior edge of the plate stack and the outer wall of the central cylinder 8. The spaces 67 and 68 are designed to hold a volume equivalent to the volume of the additive in the container 9 in the pre-activation state. The mixing of the additive and the electrolyte occurs through diffusion into the separator area between each electrode, as indicated by the arrows 69.

As those skilled in the art will recognize from the description of the invention, the electrical connections to the terminals, whether series or parallel, can be made along the lines of industry practice and are not dependent on the activation mechanism for the battery.

Figure 18:
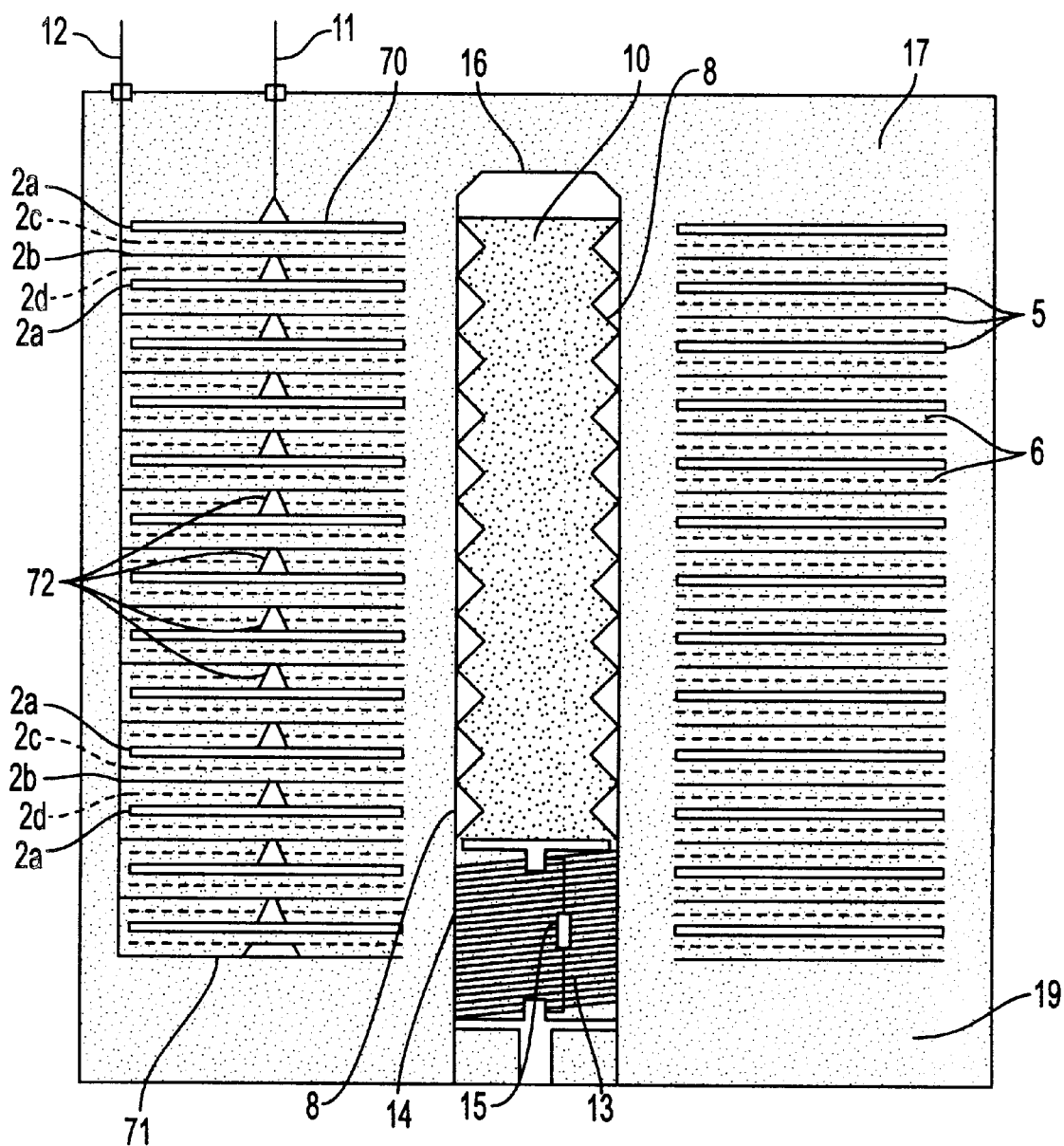
FIG. 18 illustrates a cross-sectional side view of the first embodiment of the invention having an alternative bipolar electrical connection of the positive and negative plates in a pre-activation state.

FIG. 18 illustrates a cross-sectional side view of a bipolar embodiment of the battery of the invention. The bipolar battery has an alternative electrical connection to the external battery terminals than the previous embodiments of the invention. The positive terminal 11 is connected to the top positive electrode 70, and the negative terminal 12 is connected to the bottom negative electrode 71. Series anode-to-cathode connections 72 implement the series connections for the bipolar form of the battery. The plate stack is arranged as follows: a positive electrode 2a; a permeable separator 2c; a negative electrode 2b; an impermeable separator 2d; and another positive electrode 2a with a series connection 72 connecting the negative electrode 2b and the another positive electrode 2a. The bipolar battery mimics the operation of vertically aligned end-to-end batteries in a flashlight. With the bipolar embodiment, the voltage of the battery can be increased.

Although the electrolyte 6 is preferably a specific case of the lithium thionyl chloride (Li/SOCl$_2$) electrochemical couple, other electrolytes can be used. Although additive 10 is preferably a highly acidic form of thionyl chloride formed by heavy molar concentrations of LiCl/LiAlCl$_4$ salts, other additives or organic or inorganic electrolytes can be used which are compatible with lithium and perform the same function. Particularly, the additive 10 should raise the conductivity of the electrolyte in order to promote high current drain and facilitate removal of passivation layers on the electrodes which increases the current density capability of the electrodes.

Moreover, other combinations of electrolytes 6 and additives 10 can be used in the battery 1 as will become to apparent to those skilled in the art from the description of the invention. For example, instead of the thionyl chloride system, inorganic systems could include Li/BrCl in SOCl$_2$ (Li/BCX), and organic electrolytes; Li/LiAsF$_6$; and LiBF$_4$-Methyl Formate/V$_2$O$_5$.

As an example, any electrochemical couple can be used where the electrolyte 6 is a solvent and/or a near-neutral electrolyte and where the additive 10 is any substance, such as an acid salt or other organic or inorganic substance, which can alter the electrolyte such that combined electrolyte 6 and additive 10 can perform at least one of the following: (1) facilitate the removal of the passivation layers on the electrodes of the plate stack; and (2) increase the conductivity of the electrolyte.

As another example, any electrolyte 6 and additive 10 can be used where the electrolyte 6 wetting the electrodes 2a and 2b and plates 5 is only a medium for diluting the additive 10 that activates the high-discharge rate capability in the high power mode of the battery.

As a further example, any electrolyte 6 and additive 10 can be used where the electrolyte 6 is specifically tailored to aid in the formation of the passivation layers on the electrodes 2a and 2b and/or is tolerant of passivation layers that are specifically induced during the manufacture of the electrodes 2a and 2b.

As an additional example, any electrolyte 6 and additive 10 can be used where additive 10 chemically or electrochemically removes or unblocks the passivation layers and increases the conductivity of the electrolyte 6 for high rates of discharge in the high power mode of the battery.

In addition to using the invention to obtain a bimodal reserve battery, the invention can also be used to obtain a bimodal secondary battery. For this application, the initial charge of the battery is retained during storage, and the additive 10 is kept separate to allow for subsequent discharge and charge cycles and to permit activation of the high power mode.

The invention can be used with a variety of apparatuses. For example, in the low power mode, the bimodal battery can power devices that do not require very much power, such as computer memories, clocks, built-in-test (BIT) circuits, low-current passive sensors, etc. As another example, in the high power mode, the bimodal battery can be used to power high-current devices, such as those having electric propulsion, pyrotechnic initiation, electric actuator motion, active sensors, etc. Further, the bimodal battery can be used to power an apparatus that operates underwater, on land, underground, in air, and in space.

Exemplary apparatuses that can use the bimodal battery include: a torpedo; a missile; a civilian space launch vehicle; a satellite; an unmanned autonomous vehicle; any apparatus that uses the prior art thermal batteries; security systems that require minimum electric power to maintain surveillance, but when activated, need to draw heavy current to set off alarms, sirens, light passage ways, etc; remote fire fighting equipment where low power is required to maintain the equipment, but where high power is needed to pump water/sprinkler systems in the absence of external power systems; an apparatus for supplying emergency lighting when external power is lacking; replacing a diesel or gas electric generator in an apparatus that uses a diesel or gas electric generator for emergency power; a small high power battery for charging a dead automotive battery; a standby high power battery for emergency engine start in an aircraft; a small high power battery to recharge secondary batteries for laptops or other electronic equipment when there is limited or no access to external power sources for battery recharge (e.g., transoceanic flights); a battery to power electronics to receive global positioning satellite (GPS) data and compute location and then, in emergency, be activated to broadcast a strong "save our ship" (SOS) or distress call, provide radio frequency (RF) beacon signals for rescuers, etc.; a short term power source for life support or other subsystems in emergency escape systems (e.g., aircraft ejection seats); a lightweight high power system for life support and other functions in pressure suits and hazardous materials rescue equipment.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A battery for operating in either a first or a second power mode comprising:

an outer casing;

an electrolyte located within said outer casing;

an additive located within said outer casing and separated from said electrolyte; and a power mode increasing device located within said outer casing, said power mode increasing device applying one of a positive or negative pressure to said additive to forcibly combine said additive with said electrolyte thereby causing the battery to change from operating in the first power mode to the second power mode, the power generated by the battery in the second power mode being greater than the power generated by the battery operating in the first power mode.

2. A battery according to claim 1, wherein the electrolyte comprises a balanced salt solution of $SOCl_2$ and $LiCl/LiAlCl_4$, and the additive comprises an acid salt.

3. A battery according to claim 1, further comprising electrodes within the outer casing, said electrodes having passivation layers thereon and being wetted with the electrolyte during the first power mode, said passivation layers being removed from the electrodes by the additive when said battery is operating in the second power mode.

4. A battery according to claim 1, further comprising:

electrode plates located within said outer casing, said plates having apertures therein; and a manifold located within said outer casing, said electrolyte being located between said plates, in said apertures, and in said manifold when said battery is operating in the first power mode.

5. A battery according to claim 1, further comprising a sealed compressible container located within said outer casing;

a piston located at a first end of said container for applying a positive pressure to said additive; and a pressure release device located at a second end of said container, the additive being located within said container when said battery is operating in the first power mode and being forcibly combined with said electrolyte when a positive pressure is applied to said container by said piston.

6. A battery according to claim 5, further comprising a cylinder located within said outer casing, and wherein said sealed container is a flexible membrane lining the walls of said cylinder and resting on said piston.

7. A battery according to claim 1, further comprising a cylinder located within said outer casing;

a piston located at a first end of said cylinder for applying a positive pressure to said additive;

a seal interposed between said piston and said cylinder to prevent said additive from flowing around said piston; and a pressure release valve located at a second end of said cylinder, the additive being located in said cylinder when said battery is operating in the first power mode and being forcibly combined with said electrolyte when a positive pressure is applied thereto by said piston.

8. A battery according to claim 1, wherein said power mode increasing device comprises a piston located within said outer casing, said piston being one of a spring-driven piston and a gas-driven piston, wherein movement of said piston causes the additive to forcibly combine with said electrolyte thereby causing said battery to operate in the second power mode.

9. A battery according to claim 1, further comprising an expandable manifold located within said outer casing, wherein said expandable manifold is contracted when said battery is operating in the first power mode and expanded when said battery is operating in the second power mode, and wherein said electrolyte and additive are located in said expandable manifold when said battery is operating in the second power mode.

10. A battery according to claim 1, further comprising a contractible manifold located within said outer casing, said contractible manifold being expanded when said battery is operating in the first power mode and contracted when said battery is operating in the second power mode, and said additive is located in said contractible manifold when said battery is operating in the first power mode.

11. A battery according to claim 1, wherein said power mode increasing device comprises a pyrotechnic device located within said outer casing, and wherein ignition of said pyrotechnic device causes the electrolyte and the additive to combine and thereby cause said battery to operate in the second power mode.

12. A battery according to claim 1, further comprising a frangible membrane located within said outer casing between the electrolyte and the additive when said battery is operating in the first power mode, wherein rupturing of said frangible membrane causes the electrolyte and the additive to combine and thereby causes said battery to operate in the second power mode.

13. A battery according to claim 1, further comprising a frangible ampule located within said outer casing, the additive being located within said frangible ampule when said battery is operating in the first power mode, wherein rupturing of said frangible ampule causes the electrolyte and the additive to combine and thereby causes said battery to operate in the second power mode.

14. A battery according to claim 1, wherein said power mode increasing device comprises a pump located within said outer casing, wherein pumping of said pump causes the electrolyte and the additive to combine and thereby cause said battery to operate in the second power mode.

15. A battery according to claim 1, further comprising plates located within said outer casing, a manifold located within said outer casing, and a spacing between said plates and at least one of said outer casing and an additive storage chamber, wherein the electrolyte is located between said plates, in said manifold, and in said spacing when said battery is operating in the first power mode.

16. A battery according to claim 1, wherein said power mode increasing device comprises a spring and spring releasing mechanism, wherein activating said spring releasing mechanism releases said spring, causes the electrolyte and the additive to combine, and thereby causes said battery to operate in the second power mode.

17. A battery according to claim 1, further comprising an evacuated frangible container located within said outer casing, wherein rupturing said frangible container causes said battery to change from operating in the first power mode to the second power mode.

18. A battery according to claim 1, further comprising a parallel plate stack having positive and negative electrodes connected in parallel or in series, wherein when said battery is operating in the first power mode, the electrolyte is located in the parallel plate stack and the additive is separate from the parallel plate stack.

19. A battery according to claim 1, further comprising a jellyroll plate stack located within said outer casing, wherein when said battery is operating in the first power mode, the electrolyte is located in the jellyroll plate stack and the additive is separate from the jellyroll plate stack.

20. A battery for operating in a first or a second power mode, the power generated by the battery in the second power mode being greater than the power generated in the first power mode, comprising:

an outer casing;

a sealed compressible container positioned within said outer casing, said container having first and second opposite ends;

an additive sealed within said container;

separated positive and negative electrodes, and an electrolyte, said electrodes and said electrolyte being interposed between said casing and said container;

a piston located within said container, said piston being displaceable between the first and second ends of said container; and a piston actuation means positioned within said container adjacent said piston, said piston actuation means driving said piston from the first end toward the second end of said container by applying positive pressure to said additive causing said additive to be ejected under pressure into said electrolyte, whereby said battery changes operation from said first mode to operation in said second mode.

21. A battery according to claim 20 further comprising a pressure relief device, said pressure relief device releasing the pressure generated within said container for ejection of said additive therefrom.

22. A battery according to claim 20 wherein said piston actuation means is a compressed spring, said spring being compressed when the battery is operating in the first mode and released from compression when the battery is operating in the second mode.

23. A battery according to claim 20 wherein said piston actuation means is a pyrotechnic device, said pyrotechnic device being actuated to change the operation of the battery from said first mode to said second mode.

24. A battery according to claim 5 wherein said container is a sealed envelope having bellowed sides.

25. A method of increasing the power generated by a battery from a low power mode to a substantially higher power mode, said battery comprising an outer casing, electrodes and an electrolyte located within said outer casing, an additive located within said outer casing and isolated from said electrolyte, and a power mode increasing device for applying one of a positive or negative pressure to said additive, comprising the steps of:

operating the battery in a low power mode with said additive separated from said electrolyte;

applying pressure to said additive by means of said power mode increasing device; and forcibly bringing said additive under the pressure exerted by said power mode increasing device into contact with said electrolyte, whereby the power generated by said battery is substantially increased to operate in a higher power mode.

* * * * *